(12) United States Patent
Song et al.

(10) Patent No.: US 12,455,325 B1
(45) Date of Patent: Oct. 28, 2025

(54) BATTERY MANAGING APPARATUS AND METHOD THEREOF

(71) Applicant: LG ENERGY SOLUTION, LTD., Seoul (KR)

(72) Inventors: Hee-Seok Song, Daejeon (KR); Hyun-Joo Park, Daejeon (KR); Soon-Ju Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/008,613

(22) Filed: Jan. 2, 2025

(30) Foreign Application Priority Data

Jan. 4, 2024 (KR) .......................... 10-2024-0001587

(51) Int. Cl.
*G01R 31/392* (2019.01)
*B60L 58/16* (2019.01)
*G01R 31/36* (2020.01)
*G01R 31/378* (2019.01)
*H01M 10/42* (2006.01)
*H02J 7/00* (2006.01)
*H01M 50/249* (2021.01)

(52) U.S. Cl.
CPC .......... *G01R 31/392* (2019.01); *B60L 58/16* (2019.02); *G01R 31/3648* (2013.01); *G01R 31/378* (2019.01); *H01M 10/425* (2013.01); *H02J 7/005* (2020.01); *H01M 2010/4271* (2013.01); *H01M 50/249* (2021.01)

(58) Field of Classification Search
CPC ................ G01R 31/392; G01R 31/378; G01R 31/3648; B60L 58/16; H02J 7/005; H01M 10/425; H01M 50/249
USPC ........................................................ 320/109
See application file for complete search history.

(56) References Cited

U.S. PATENT DOCUMENTS

| | | | |
|---|---|---|---|
| 10,511,050 B1* | 12/2019 | Rahimian | ......... H01M 10/0525 |
| 12,117,501 B2 | 10/2024 | Cha | |
| 2023/0023014 A1 | 1/2023 | Choi | |
| 2023/0039356 A1 | 2/2023 | Jee | |
| 2024/0288498 A1* | 8/2024 | Takegami | ............ G01R 31/392 |

FOREIGN PATENT DOCUMENTS

| | | |
|---|---|---|
| CN | 115808636 A | 3/2023 |
| EP | 4425646 A1 | 9/2024 |
| JP | 2015230817 A | 12/2015 |

(Continued)

*Primary Examiner* — Nathaniel R Pelton
(74) *Attorney, Agent, or Firm* — Bryan Cave Leighton Paisner LLP

(57) ABSTRACT

A battery managing apparatus according to one embodiment of the present disclosure includes: a profile acquisition unit configured to obtain a battery profile representing the relationship between voltage and capacity of the battery; a profile determination unit configured to adjust a preset reference positive electrode profile and reference negative electrode profile to correspond to the battery profile and determine the positive electrode profile and negative electrode profile of the battery; and a control unit configured to calculate the lithium loss rate of the battery based on the positive electrode profile, calculate the negative electrode side-reaction rate of the battery based on the battery profile, and calculate the positive electrode side-reaction rate of the battery based on the lithium loss rate and the negative electrode side-reaction rate.

17 Claims, 14 Drawing Sheets

(56) References Cited

FOREIGN PATENT DOCUMENTS

| | | | |
|---|---|---|---|
| JP | 2023102800 | A | 7/2023 |
| KR | 1020210146699 | A | 12/2021 |
| KR | 1020220009918 | A | 1/2022 |
| KR | 10-2022-0031412 | A | 3/2022 |
| KR | 1020220056150 | A | 5/2022 |
| KR | 10-2022-0094042 | A | 7/2022 |
| KR | 102600139 | B1 | 11/2023 |
| WO | 2022239188 | A1 | 11/2022 |

* cited by examiner

BATTERY MANAGING APPARATUS AND METHOD THEREOF

CROSS-REFERENCE TO RELATED APPLICATIONS

This application is based on and claims priority from Korean Patent Application No. 10-2024-0001587, filed on Jan. 4, 2024, with the Korean Intellectual Property Office, the disclosure of which is incorporated herein in its entirety by reference.

TECHNICAL FIELD

The present disclosure relates to a battery managing apparatus and method thereof.

BACKGROUND

Recently, as the demand for portable electronic products such as laptops, video cameras, and portable phones has rapidly increased, and the development of electric vehicles, energy storage batteries, robots, and satellites has begun in earnest, research on the repeatedly chargeable/dischargeable high-performance batteries is actively underway.

Currently commercialized batteries include, for example, nickel cadmium batteries, nickel hydrogen batteries, nickel zinc batteries, and lithium batteries. Among these, the lithium batteries are in the spotlight because of their advantages, such as, for example, almost no memory effect compared to the nickel-based batteries allowing unrestricted charging and discharging, very low self-discharging rate, and high energy density.

While research is being conducted to enhance the capacity and density of these batteries, improving their lifespan and safety is also important. To enhance the battery safety, various studies are underway including studies on the technologies capable of accurately diagnosing the current state of batteries.

SUMMARY

The present disclosure provides a battery managing apparatus and method thereof capable of separately calculating the lithium loss rate, negative electrode side-reaction rate, and positive electrode side-reaction rate of a battery.

Various aspects of the present disclosure may be understood through the following description and will become more apparent from the embodiments of the present disclosure. It will also be understood that the various aspects of the present disclosure may be implemented through the means and combinations thereof as set forth in the claims.

A battery managing apparatus according to an aspect of the present disclosure may include: a profile acquisition unit configured to obtain a battery profile representing the relationship between voltage and capacity of the battery: a profile determination unit configured to adjust a preset reference positive electrode profile and reference negative electrode profile to correspond to the battery profile, and determine the positive electrode profile and negative electrode profile of the battery; and a control unit configured to calculate the lithium loss rate of the battery based on the positive electrode profile, calculate the negative electrode side-reaction rate of the battery based on the battery profile, and calculate the positive electrode side-reaction rate of the battery based on the lithium loss rate and the negative electrode side-reaction rate.

The control unit may be configured to calculate the positive electrode side-reaction rate by calculating the difference between the negative electrode side-reaction rate and the lithium loss rate.

The battery profile may be configured to include a charging profile representing the relationship between the voltage and the capacity of the battery during the charging process and a discharging profile representing the relationship between the voltage and the capacity of the battery during the discharging process.

The control unit may be configured to calculate the charging capacity of the battery from the charging profile, calculate the discharging capacity of the battery from the discharging profile, and calculate the negative electrode side-reaction rate based on the charging capacity and the discharging capacity.

The control unit may be configured to calculate the capacity difference between the charging capacity and the discharging capacity, add the calculated capacity difference to a preset cumulative capacity difference to update the cumulative capacity difference, and calculate the negative electrode side-reaction rate based on the updated cumulative capacity difference.

The control unit may be configured to calculate the negative electrode side-reaction rate by dividing the updated cumulative capacity difference by a preset reference capacity.

The control unit may be configured to preset the cumulative capacity difference by summing the capacity differences determined in each of the previous charge-discharge cycles of the battery.

The profile determination unit may be configured to adjust the reference positive electrode profile and the reference negative electrode profile to correspond to the discharging profile.

The control unit may be configured to extract a positive electrode activation onset point from the positive electrode profile of the battery as a diagnostic factor, and calculate the lithium loss rate of the battery based on the extracted diagnostic factor, a preset reference onset point, and a preset reference endpoint.

The reference onset point may include a positive electrode reference onset point, and the reference endpoint may include a positive electrode reference endpoint.

The control unit may be configured to calculate the lithium loss rate based on the target value of the extracted diagnostic factor, the positive electrode reference onset value of the positive electrode reference onset point, and the positive electrode reference endpoint value of the positive electrode reference endpoint.

The reference onset point may include a positive electrode reference onset point and a negative electrode reference onset point, and the reference endpoint may include a negative electrode reference endpoint.

The control unit may be configured to calculate the lithium loss rate based on the target value of the extracted diagnostic factor, the positive electrode reference onset value of the positive electrode reference onset point, the negative electrode reference onset value of the negative electrode reference onset point, and the negative electrode reference endpoint value of the negative electrode reference endpoint.

The control unit may be configured to set usage conditions for the battery based on at least one of the positive electrode side-reaction rate, the negative electrode side-reaction rate, and the lithium loss rate.

A battery pack according to another aspect of the present disclosure may include the battery managing apparatus according to an aspect of the present disclosure. A vehicle according to yet another aspect of the present disclosure may include the battery managing apparatus according to an aspect of the present disclosure.

A battery managing method according to another aspect of the present disclosure may include: a profile acquisition step of obtaining a battery profile representing a relationship between the voltage and capacity of a battery: a profile determination step of adjusting a preset reference positive electrode profile and reference negative electrode profile to correspond to the battery profile and determining the positive electrode profile and negative electrode profile of the battery: a lithium loss rate and negative electrode side-reaction rate calculation step of calculating a lithium loss rate of the battery based on the positive electrode profile of the battery and calculating a negative electrode side-reaction rate of the battery based on the battery profile; and a positive electrode side-reaction rate calculation step of calculating a positive electrode side-reaction rate of the battery based on the lithium loss rate and the negative electrode side-reaction rate.

The battery managing method according to another aspect of the present disclosure may further include a step of comparing the lithium loss rate, the negative electrode side-reaction rate, and the positive electrode side-reaction rate with respective reference values.

The battery managing method according to another aspect of the present disclosure may further include a step of setting usage conditions for the battery when, as a result of the comparison, any one of the lithium loss rate, the negative electrode side-reaction rate, and the positive electrode side-reaction rate exceeds the reference value.

Still another aspect of the present disclosure relates to a non-transitory computer-readable storage medium storing a program for executing a battery managing method. The battery managing method include: a profile acquisition step of obtaining a battery profile representing a relationship between the voltage and capacity of a battery: a profile determination step of adjusting a preset reference positive electrode profile and reference negative electrode profile to correspond to the battery profile and determining the positive electrode profile and negative electrode profile of the battery: a lithium loss rate and negative electrode side-reaction rate calculation step of calculating a lithium loss rate of the battery based on the positive electrode profile of the battery and calculating a negative electrode side-reaction rate of the battery based on the battery profile; and a positive electrode side-reaction rate calculation step of calculating a positive electrode side-reaction rate of the battery based on the lithium loss rate and the negative electrode side-reaction rate.

A battery managing apparatus according to an aspect of the present disclosure may be configured to separately calculate the lithium loss rate, the negative electrode side-reaction rate, and the positive electrode side-reaction rate for a battery degraded as charging and discharging are repeated.

A battery managing apparatus according to an aspect of the present disclosure may be configured to appropriately set the usage conditions of the battery based on at least one of the calculated lithium loss rate, negative electrode side-reaction rate, and positive electrode side-reaction rate, thereby preventing or suppressing battery degradation or the acceleration of degradation.

The effects of the present disclosure are not limited to those mentioned above, and other effects not mentioned above will be clearly understood by persons ordinarily skilled in the art from the description of the claims.

BRIEF DESCRIPTION OF THE DRAWINGS

The following drawings attached hereto serve to further aid in understanding the technical spirit of the present disclosure in conjunction with the detailed description of the present disclosure described below. Therefore, the present disclosure should not be construed as being limited only to the matters illustrated in such drawings.

DETAILED DESCRIPTION

Figure 1:
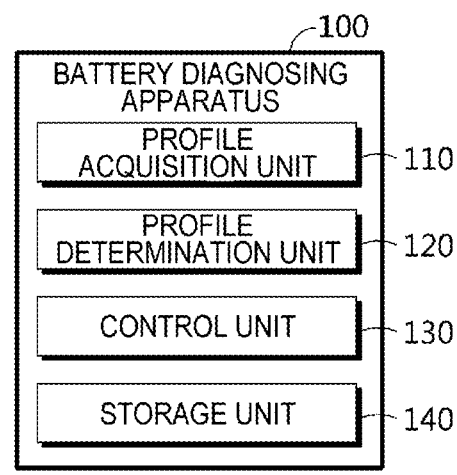
FIG. 1 is a view schematically illustrating a battery managing apparatus, according to an embodiment of the present disclosure.

The terms or words used in the specification and claims should not be construed as limited to their ordinary or dictionary meanings, but should be construed as having meanings and concepts consistent with the technical idea of the present disclosure based on the principle that an inventor may appropriately define the concepts of terms in order to explain his or her own invention in the best way.

Accordingly, since the embodiments described in this description and the configurations illustrated in the drawings are merely exemplary embodiments of the present disclosure, and do not represent all of the technical ideas of the present disclosure, it should be understood that at the time of filing, there may be various equivalents and modifications that could serve as alternatives to the embodiments.

In describing the present disclosure, detailed explanations of related known functions and configurations will be omitted when it is determined that such detailed explanations may obscure the gist of the present disclosure.

Terms containing ordinal numbers, such as "first" and "second," are used to distinguish one from another among various components and are not intended to limit or define the components with such terms.

Throughout the specification, when a part is described as "including" a certain component, it means that, unless there is specific contrary wording, it does not exclude other components, but rather indicates that other components may be further included.

In addition, throughout the specification, when a part is described as being "connected" to another part, this includes not only the case where the parts are "directly connected," but also the case where the parts are "indirectly connected," with another element interposed therebetween.

The loss of available capacity due to battery degradation is related to the loss of available lithium, and the loss of available lithium in the battery is caused by side-reactions occurring at the negative electrode or the positive electrode. For example, a negative electrode side-reaction (anode side-reaction (ASR)) in which lithium ions are consumed at the negative electrode, and a positive electrode side-reaction (cathode side-reaction (CSR)) in which the positive electrode gains lithium ions from decomposed electrolyte, are directly related to the loss of available lithium in the battery.

Furthermore, when side-reactions occur on the positive electrode or the negative electrode, gas may be generated through the reaction between lithium ions and the electrolyte. An example of a negative electrode side-reaction includes the reduction decomposition of part of the electrolyte, during which reduction gases such as hydrogen ($H_2$) and hydrocarbons ($C_xH_y$) may be generated as lithium precipitates on the negative electrode. An example of the positive electrode side-reaction includes the oxidative decomposition of part of the electrolyte, during which oxidative gases such as carbon monoxide (CO) and carbon dioxide ($CO_2$) may be generated. Meanwhile, the gases generated inside the battery may lead to an increase in pressure accompanied by a rise in temperature, causing safety issues such as explosions.

As described above, the loss of available lithium, positive electrode side-reaction, and negative electrode side-reaction are directly related to battery degradation and the generation of internal gases. For example, if the extent of the loss of available lithium, positive electrode side-reaction, and negative electrode side-reaction may be quantitatively calculated, the values may serve as important indicators for degradation diagnosis and gas amount prediction. The present disclosure provides a technology, method, and apparatus capable of quantitatively separating the loss of available lithium caused by a positive electrode side-reaction and the loss of available lithium caused by a negative electrode side-reaction.

Hereinafter, embodiments of the present disclosure will be described in detail with reference to the accompanying drawings.

FIG. 1 schematically illustrates a battery managing apparatus 100, according to an embodiment of the present disclosure.

Referring to FIG. 1, the battery managing apparatus 100 may include a profile acquisition unit 110, a profile determination unit 120, and a control unit 130.

Here, the battery refers to a single, physically separable cell equipped with a negative electrode terminal and a positive electrode terminal. For example, a lithium-ion battery or a lithium polymer battery may be considered as a battery. In addition, the type of the battery may be cylindrical, prismatic, or pouch-type. Furthermore, the battery may also refer to a battery bank, battery module, or battery pack including multiple cells connected in series and/or in parallel. Hereinafter, for the convenience of explanation, the term "battery" will be described as referring to a single, independent cell.

The profile acquisition unit 110 may be configured to obtain a battery profile representing the relationship between the voltage and capacity of a battery.

Figure 2:
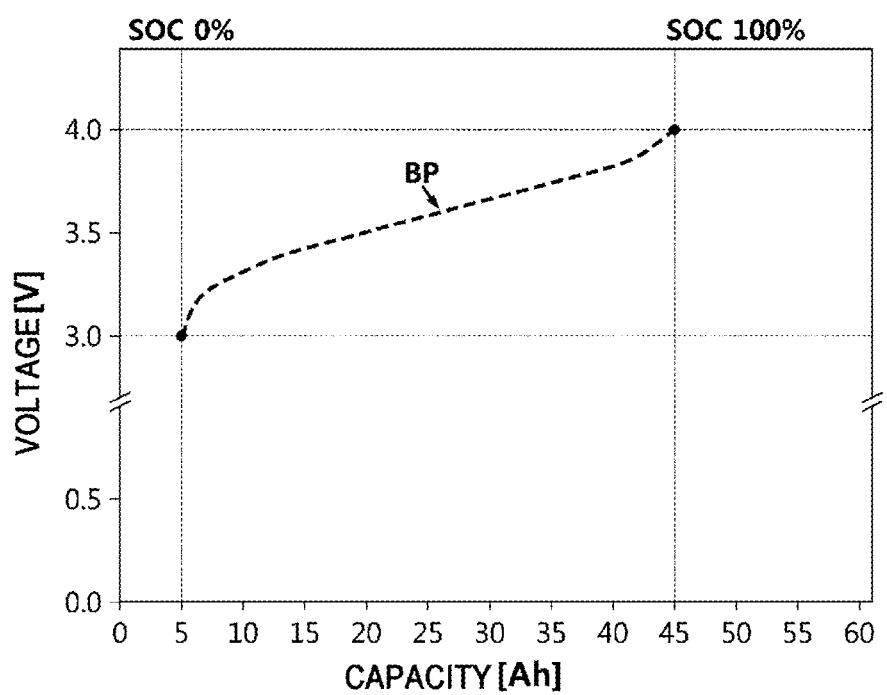
FIG. 2 is a view schematically illustrating a battery profile, according to an embodiment of the present disclosure.

FIG. 2 schematically illustrates a battery profile, according to an embodiment of the present disclosure.

In the embodiment of FIG. 2, the horizontal axis (the X-axis) represents capacity (Ah), and the vertical axis (the Y-axis) represents voltage (V).

The battery profile BP is a profile that represents the relationship between the voltage V and capacity Q of a battery during charging. In addition, the battery profile BP may also represent the relationship between the voltage V and capacity Q of the battery during discharging.

For example, the profile acquisition unit 110 may directly receive the battery profile BP to be monitored from an external source. That is, the profile acquisition unit 110 may obtain the battery profile BP to be monitored by receiving the battery profile BP through a wired and/or wireless connection with an external source.

As another example, the profile acquisition unit 110 may receive battery information regarding the voltage V and capacity Q of the battery instead of directly receiving the battery profile BP, and may generate the battery profile BP based on the received battery information. For example, the profile acquisition unit 110 may obtain the battery profile BP by directly generating the battery profile BP based on battery information such as the voltage V and capacity Q of the battery.

The profile acquisition unit 110 may be connected to the profile determination unit 120 to enable communication. For example, the profile acquisition unit 110 may be connected to the profile determination unit 120 via a wired and/or wireless connection. The profile acquisition unit 110 may transmit the acquired battery profile BP to the profile determination unit 120.

The profile determination unit 120 may be configured to adjust a preset reference positive electrode profile and reference negative electrode profile to correspond to the battery profile BP and determine the positive electrode profile and negative electrode profile of the battery.

The reference positive electrode profile may be a profile representing the relationship between the preset capacity and voltage of a reference positive electrode cell to correspond to the positive electrode of the battery. For example, the reference positive electrode cell may be the positive electrode of a positive electrode coin half-cell or a three-electrode cell. In addition, the reference negative electrode profile may be a profile representing the relationship between the preset capacity and voltage of a reference negative electrode cell to correspond to the negative electrode of the battery. For example, the reference negative electrode cell may be the negative electrode of a negative electrode coin half-cell or a three-electrode cell.

First, the profile determination unit 120 may be configured to generate a comparison profile based on the reference positive electrode profile and reference negative electrode profile.

For example, the profile determination unit 120 may generate an adjusted positive electrode profile and an adjusted negative electrode profile by adjusting the reference positive electrode profile and the reference negative electrode profile to correspond to the battery profile BP. Then, the profile determination unit 120 may generate a comparison profile from the adjusted positive electrode profile and the adjusted negative electrode profile. The profile determination unit 120 may adjust the reference positive electrode profile and the reference negative electrode profile until the comparison profile corresponds to the battery profile BP.

For example, the profile determination unit 120 may generate multiple comparison profiles by repeating adjustment procedures (such as shifting or capacity scaling of the profiles) and synthesis procedures for the reference positive electrode profile and the reference negative electrode profile. The profile determination unit 120 may identify the comparison profile with the smallest error relative to the battery profile BP among the multiple comparison profiles. Then, the profile determination unit 120 may determine the adjusted positive electrode profile and the adjusted negative electrode profile used to generate the identified comparison profile as the positive electrode profile and the negative electrode profile of the battery.

The adjusted positive electrode profile and the adjusted negative electrode profile used to generate the identified comparison profile may be estimated as the positive electrode profile and the negative electrode profile representing the current state of the battery. With the current technology, it is not possible to directly obtain the positive electrode profile and the negative electrode profile representing the current state of the battery without directly disassembling the battery. However, according to the battery managing apparatus 100 of the present disclosure, the adjusted positive electrode profile and the adjusted negative electrode profile, which form the basis of the identified comparison profile, may be estimated as the positive electrode profile and the negative electrode profile reflecting the current state of the battery.

In this regard, an embodiment in which the profile determination unit 120 adjusts the reference positive electrode profile and the reference negative electrode profile to determine the positive electrode profile and the negative electrode profile of a battery will be described later with reference to FIGS. 4 to 11.

The control unit 130 may be configured to calculate the lithium loss rate of the battery based on the positive electrode profile of the battery.

Figure 3:
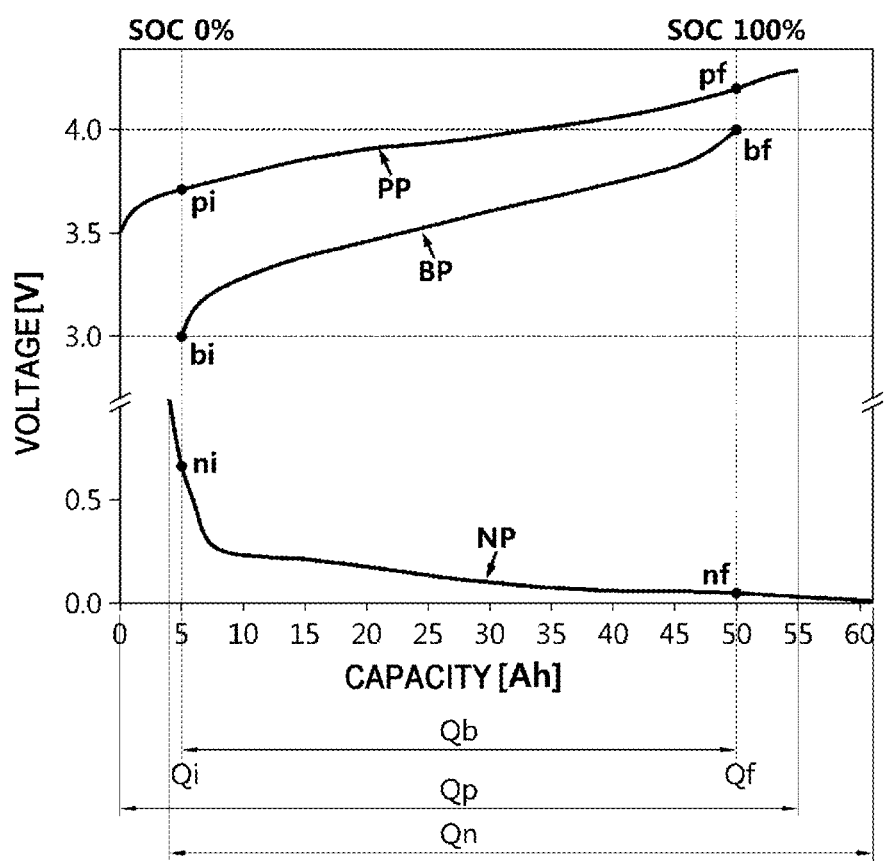
FIG. 3 is a view schematically illustrating a positive electrode profile and a negative electrode profile of a battery, according to an embodiment of the present disclosure.

FIG. 3 schematically illustrates the positive electrode profile PP and the negative electrode profile NP of a battery according to an embodiment of the present disclosure.

According to an embodiment, the control unit 130 may be configured to extract the positive electrode activation onset point pi from the positive electrode profile PP of a battery as a diagnostic factor, and calculate the lithium loss rate of the battery based on the extracted diagnostic factor, a preset reference onset point, and a preset reference endpoint.

According to an embodiment, the reference onset point and the reference endpoint may be preset based on the result of adjusting the reference positive electrode profile and reference negative electrode profile to correspond to the battery profile obtained when the battery is in a beginning of life (BOL) state. The "BOL" refers to the initial state of the battery, which is the state at which the battery may exert maximum capacity and performance at the time of first use after manufacturing.

The reference onset point and reference endpoint may be preset by the control unit 130. For example, the profile determination unit 120 may adjust the reference positive electrode profile and the reference negative electrode profile to correspond to the battery profile obtained when the battery is in the BOL state. Then, the profile determination unit 120 may determine an initial positive electrode profile and an initial negative electrode profile corresponding to the battery in the BOL state based on the adjusted results. The method by which the profile determination unit 120 determines the initial positive electrode profile and the initial negative electrode profile is the same as the method for determining the positive electrode profile and the negative electrode profile of the battery. The control unit 130 may preset the reference onset point and the reference endpoint based on the initial positive electrode profile and/or the initial negative electrode profile.

For example, the reference onset point may include a positive electrode reference onset point and/or a negative electrode reference onset point, and the reference endpoint may include a positive electrode reference endpoint and/or a negative electrode reference endpoint. Here, the positive electrode reference onset point refers to the positive electrode activation onset point of the initial positive electrode profile. The positive electrode reference endpoint refers to the positive electrode activation endpoint of the initial positive electrode profile. In addition, the negative electrode reference onset point refers to the negative electrode activation onset point of the initial negative electrode profile. The negative electrode reference endpoint refers to the negative electrode activation endpoint of the initial negative electrode profile.

According to an embodiment, the control unit 130 may be configured to calculate the lithium loss rate based on the target value of the extracted diagnostic factor, the positive electrode reference onset value of the positive electrode reference onset point, and the positive electrode reference endpoint value of the positive electrode reference endpoint.

Here, the target value of the diagnostic factor, the reference onset value of the reference onset point, and the reference endpoint value of the reference endpoint may be calculated based on capacity.

According to an embodiment, the control unit 130 may calculate the target value of the diagnostic factor by dividing the capacity of the diagnostic factor by the current capacity difference. Here, the diagnostic factor may be the positive electrode activation onset point pi. The control unit 130 may calculate the target value of the positive electrode activation onset point pi by dividing the capacity of the positive electrode activation onset point pi by the current capacity difference.

For example, in the embodiment of FIG. 3, the current capacity difference may be the difference Qp between the minimum capacity (start capacity) and the maximum capacity (end capacity) of the positive electrode profile PP of a battery. In this case, the target value of the positive electrode activation onset point pi may be the value calculated according to the formula "$Qi \div Qp$."

As another example, in the embodiment of FIG. 3, the current capacity difference may be the difference Qn between the minimum capacity and the maximum capacity of the negative electrode profile (NP) of the battery. In this case, the target value of the negative electrode activation onset point ni may be the value calculated according to the formula "$Qi \div Qn$."

In yet another example, in the embodiment of FIG. 3, the current capacity difference may be the difference Qb between the minimum capacity and the maximum capacity of the battery profile BP. In this case, the target value of the positive electrode activation onset point pi may be the value calculated according to the formula "$Qi \div Qb$."

The positive electrode reference onset value may be preset as the value obtained by dividing the capacity of the positive electrode reference onset point by the initial capacity difference. The positive electrode reference endpoint value may be preset as the value obtained by dividing the capacity of the positive electrode reference endpoint by the initial capacity difference. For example, the initial capacity difference may be the difference between the minimum capacity and the maximum capacity of the initial positive electrode profile. As another example, the initial capacity difference may be the difference between the minimum capacity and the maximum capacity of the initial negative electrode profile. In yet another example, the initial capacity difference may be the difference between the minimum capacity and the maximum capacity of the battery profile obtained for the battery in the BOL state.

The profiles used to calculate the current capacity difference and the initial capacity difference may correspond to one another. For example, when the positive electrode profile PP of the battery is used to calculate the current capacity difference, the initial positive electrode profile may be used to calculate the initial capacity difference. As another example, when the negative electrode profile NP of the battery is used to calculate the current capacity difference, the initial negative electrode profile may be used to calculate the initial capacity difference. In yet another example, when the battery profile BP is used to calculate the current capacity difference, the battery profile obtained for the battery in the BOL state may be used to calculate the initial capacity difference. That is, when the positive electrode reference onset value is set to correspond to the initial capacity difference of the initial positive electrode profile, the target value of the diagnostic factor should be set to correspond to the current capacity difference of the positive electrode profile PP of the battery.

The control unit 130 may calculate a first difference, which is the difference between the target value of the positive electrode activation onset point pi and the positive electrode reference onset value, and a second difference, which is the difference between the positive electrode reference endpoint value and the positive electrode reference onset value. The control unit 130 may calculate the ratio of the first difference to the second difference to calculate the lithium loss rate.

For example, the control unit 130 may calculate the lithium loss rate using Equation 1 below.

$$K_{Li} = \frac{pi_{MOL} - pi_{BOL}}{pf_{BOL} - pi_{BOL}} \qquad \text{[Equation 1]}$$

Here, $K_{Li}$ represents the lithium loss rate, $pi_{MOL}$ represents the target value of the positive electrode activation onset point, $pi_{BOL}$ represents the positive electrode reference onset value, and $pf_{BOL}$ represents the positive electrode reference endpoint value. The "middle of life (MOL)" refers to the state in which the battery has been used to some extent and has degraded compared to its initial performance (BOL), but still operates normally.

As another example, the reference onset point may be configured to include a positive electrode reference onset point and a negative electrode reference onset point, and the reference endpoint may be configured to include a negative electrode reference endpoint.

Here, the positive electrode reference onset point refers to the positive electrode activation onset point of the initial positive electrode profile. The negative electrode reference onset point refers to the negative electrode activation onset point of the initial negative electrode profile. The negative electrode reference endpoint refers to the negative electrode activation endpoint of the initial negative electrode profile.

The control unit 130 may be configured to calculate the lithium loss rate based on the target value of the extracted diagnostic factor, the positive electrode reference onset value of the positive electrode reference onset point, the negative electrode reference onset value of the negative electrode reference onset point, and the negative electrode reference endpoint value of the negative electrode reference endpoint.

According to an embodiment, when the positive electrode activation onset point pi is extracted as the diagnostic factor, the target value of the positive electrode activation onset point may be calculated by dividing the capacity of the positive electrode activation onset point by the current capacity difference.

In addition, the positive electrode reference onset value may be calculated by dividing the capacity of the positive electrode reference onset point by the initial capacity difference. The negative electrode reference onset value may be calculated by dividing the capacity of the negative electrode reference onset point by the initial capacity difference. The negative electrode reference endpoint value may be calculated by dividing the capacity of the negative electrode reference endpoint by the initial capacity difference. As described above, the initial capacity difference may be the difference between the minimum capacity and maximum capacity of the initial positive electrode profile, the initial negative electrode profile, or the battery profile of the battery in the BOL state.

The control unit 130 may calculate a first difference, which is the difference between the target value of the positive electrode activation onset point and the positive electrode reference onset value, and a third difference, which is the difference between the negative electrode reference endpoint value and the negative electrode reference onset value. The control unit 130 may calculate the lithium loss rate by calculating the ratio of the first difference to the third difference.

For example, the control unit 130 may calculate the lithium loss rate using Equation 2 below.

$$K_{Li} = \frac{pi_{MOL} - pi_{BOL}}{nf_{BOL} - ni_{BOL}} \qquad \text{[Equation 2]}$$

Here, $K_{Li}$ represents the lithium loss rate, $pi_{MOL}$ represents the target value of the positive electrode activation onset point, $pi_{BOL}$ represents the positive electrode reference onset value, $ni_{BOL}$ represents the negative electrode reference onset value, and $nf_{BOL}$ represents the negative electrode reference endpoint value.

The control unit 130 may be configured to calculate the negative electrode side-reaction rate of the battery based on the battery profile BP.

The battery profile BP may include a charging profile representing the relationship between the voltage and the capacity of the battery during the charging process and a discharging profile representing the relationship between the voltage and the capacity of the battery during the discharging process.

The control unit 130 may be configured to calculate the charging capacity of the battery from the charging profile, calculate the discharging capacity of the battery from the discharging profile, and calculate the negative electrode side-reaction rate based on the charging capacity and the discharging capacity.

The charging capacity may refer to the capacity of the battery charged from the point when charging is initiated to the point when charging is terminated. The discharging capacity may refer to the capacity of the battery discharged from the point when discharging is initiated to the point when discharging is terminated.

The control unit 130 may calculate the negative electrode side-reaction rate based on the difference between the charging capacity and the discharging capacity.

For example, the control unit 130 may calculate the capacity difference between the charging capacity and the discharging capacity. The control unit 130 may be configured to update the cumulative capacity difference by adding the calculated capacity difference to a preset cumulative capacity difference. The control unit 130 may preset the cumulative capacity difference by cumulatively summing the capacity differences respectively determined in the previous charge-discharge cycles of the battery. That is, the cumulative capacity difference may be the sum of one or more capacity differences determined in the previous charge-discharge cycles.

For example, it is assumed that n is a natural number equal to or greater than 2, and that the current charge-discharge cycle is the $n_{th}$ charge-discharge cycle. The cumulative capacity difference may be preset as the sum of (n-1) capacity differences determined in the first to $(n-1)_{th}$ charge-discharge cycles, respectively. The control unit 130 may update the cumulative capacity difference by adding the capacity difference determined in the $n_{th}$ charge-discharge cycle to the cumulative capacity difference.

The control unit 130 may be configured to calculate a negative electrode side-reaction rate based on the updated cumulative capacity difference.

Here, the negative electrode side-reaction rate is an indicator that quantitatively represents a side-reaction occurring on the negative electrode of the battery. The negative electrode side-reaction (anode side-reaction (ASR)) refers to a reaction in which lithium ions are consumed at the negative electrode of the battery. For example, the negative electrode side-reaction may occur due to, for example, lithium plating caused by the reduction decomposition of part of the electrolyte, the reaction between lithium ions and the electrolyte, the instability of the negative electrode active material, or the structural collapse of the negative electrode active material. In addition, all or part of the lithium ions consumed by the negative electrode side-reaction may generate reduction gases such as hydrogen ($H_2$) and hydrocarbons ($C_xH_y$) through reactions with the electrolyte.

The charging process of a battery is the process in which lithium ions move from the positive electrode to the negative electrode, while the discharging process is the process in which lithium ions move from the negative electrode to the positive electrode. Therefore, the amount of lithium ions moving from the positive electrode to the negative electrode is related to the charging capacity of the battery, and the amount of lithium ions moving from the negative electrode to the positive electrode is related to the discharging capacity of the battery. In an ideal charge-discharge cycle of the battery, the charging capacity and discharging capacity are the same. However, in the actual charge-discharge cycle of the battery, the charging capacity and discharging capacity may differ due to factors such as internal resistance. That is, hysteresis phenomena may occur in the actual charge-discharge cycle of the battery.

In summary, during consecutive charge-discharge cycles of the battery, the amount of lithium ions moving from the positive electrode to the negative electrode (charging capacity) and the amount of lithium ions moving from the negative electrode to the positive electrode (discharging capacity) should be equal. However, in actual charge-discharge cycles, among the ions received by the negative electrode from the positive electrode during the charging process, there are lithium ions that the negative electrode fails to return to the positive electrode during the discharging process. This causes reversible and irreversible losses of lithium ions at the negative electrode. That is, the difference between the charging capacity and the discharging capacity of the battery is related to the amount of lithium ions consumed by the negative electrode side-reaction.

The control unit 130 may calculate the negative electrode side-reaction rate by dividing the updated cumulative capacity difference by a preset reference capacity.

Here, the reference capacity may represent the charging capacity or discharging capacity during the first charge-discharge cycle of the battery.

Considering the hysteresis phenomenon occurring during the battery's charge-discharge process and the direction of lithium ion movement during charging and discharging, the discharging capacity during the battery's first charge-discharge cycle may be preset as the reference capacity.

In this case, the negative electrode side-reaction rate may refer to the ratio of a negative electrode side-reaction amount (the amount of lithium ions consumed by the negative electrode side-reaction) to the amount of lithium ions capable of being provided to the positive electrode by the negative electrode in the beginning of life (BOL) state of the battery.

For example, the control unit 130 may calculate the negative electrode side-reaction rate using Equation 3 and Equation 4.

$$Q_{accum\_n} = \sum_{i=1}^{n}(Q_{ch\_i} - Q_{dch\_i}) \qquad \text{[Equation 3]}$$

Here, $Q_{accum\_n}$ represents the cumulative capacity difference. In addition, n represents the number of charge-discharge cycles at the current point in time (when the negative electrode side-reaction rate is being calculated), $Q_{ch}$ represents the charging capacity, $Q_{dch}$ represents the discharging capacity, and ($Q_{ch\_i}$ $Q_{dch\_i}$) represents the capacity difference in the $i_{th}$ charge-discharge cycle.

$$K_{ASR} = \frac{Q_{accum\_n}}{Q_1} \qquad \text{[Equation 4]}$$

Here, $K_{ASR}$ represents the negative electrode side-reaction rate, and $Q_1$ represents the reference capacity.

The control unit 130 may be configured to calculate the positive electrode side-reaction rate of the battery based on the lithium loss rate and the negative electrode side-reaction rate. For example, the control unit 130 may calculate the negative side-reaction rate by calculating the difference between the negative electrode side-reaction rate and the lithium loss rate.

Here, the lithium loss rate is an indicator that quantitatively represents the loss of available lithium due to battery degradation, and the positive electrode side-reaction rate is an indicator that quantitatively represents a side-reaction occurring at the positive electrode of the battery. The positive electrode side-reaction (cathode side-reaction (CSR)) refers to a reaction in which the positive electrode gains lithium ions from decomposed electrolyte. For instance, when part of the electrolyte contained in the battery undergoes oxidative decomposition, lithium ions released from the decomposed electrolyte may be supplied to the positive electrode. In this case, since the positive electrode undergoes self-discharge in the high SOC range (e.g., SOC 90% to 100% range), the high SOC range of the positive electrode may become unusable during battery charging.

For example, the control unit 130 may calculate the positive electrode side-reaction rate using Equation 5.

$$K_{CSR} = K_{ASR} - K_{Li} \qquad \text{Equation 5}$$

Here, $K_{CSR}$ represents the positive electrode side-reaction rate, $K_{ASR}$ represents the negative electrode side-reaction rate, and $K_{Li}$ represents the lithium loss rate. For example, $K_{ASR}$ is the negative electrode side-reaction rate according to Equation 4, and $K_{Li}$ is the lithium loss rate according to Equation 1 or Equation 2.

The battery managing apparatus 100 according to the present disclosure has the advantage of being able to quantitatively calculate the lithium loss rate, the negative electrode side-reaction rate, and the positive electrode side-reaction rate for a battery degraded as charge-discharge cycles are repeated. In other words, the lithium loss rate of a battery may be quantitatively separated into a negative electrode side-reaction rate and a positive electrode side-reaction rate.

Meanwhile, the profile acquisition unit 110, the profile determination unit 120, and the control unit 130 included in the battery managing apparatus 100 may optionally include, for example, a processor, an application-specific integrated circuit (ASIC), another chipset, a logic circuit, a register, a communication modem, and a data processing device known to those skilled in the art to execute various control logics performed in the present disclosure. In addition, when the control logics are implemented in software, the profile acquisition unit 110, the profile determination unit 120, and the control unit 130 may be implemented as a set of program modules. In this case, the program modules may be stored in memory and may be executed by the profile acquisition unit 110, the profile determination unit 120, and the control unit 130. The memory may be located either inside or outside the battery managing apparatus 100 and may be connected to the profile acquisition unit 110, the profile determination unit 120, and the control unit 130 by various well-known means.

In addition, the battery managing apparatus 100 may further include a storage unit 140. The storage unit 140 may store data or programs necessary for the operation and functions of each component of the battery managing apparatus 100, as well as, for example, data generated during the process of performing such operations and functions. The storage unit 140 is not particularly limited in type as long as it is a known information storage means capable of recording, erasing, updating, and deriving data. As an example, the information storage means may include, for example, RAM, flash memory, ROM, EEPROM, and a register. Moreover, the storage unit 140 may store program codes defining processes executable by the profile acquisition unit 110, the profile determination unit 120, and the control unit 130.

The storage unit 140 may store information necessary for the profile acquisition unit 110 to obtain a battery profile. The storage unit 140 may store information necessary for the profile determination unit 120 to determine the positive electrode profile and negative electrode profile of a battery. In addition, the storage unit 140 may store information necessary for the control unit 130 to calculate a lithium loss rate, a negative electrode side-reaction rate, and a positive electrode side-reaction rate of a battery. For example, the storage unit 140 may store a reference positive electrode profile, a reference negative electrode profile, a cumulative capacity difference, reference capacity, a reference onset point, and a reference endpoint. The profile acquisition unit 110, the profile determination unit 120, and the control unit 130 may access the storage unit 140 to obtain the necessary information.

Meanwhile, the profile determination unit 120 may be configured to adjust the reference positive electrode profile and the reference negative electrode profile to correspond to the discharging profile. As a result, the control unit 130 calculates the lithium loss rate of the battery based on the discharging profile.

The battery managing apparatus 100 according to the present disclosure calculates the negative electrode side-reaction rate by deducting the discharging capacity from the charging capacity after the charging and discharging processes. The positive electrode side-reaction rate is then calculated based on the negative electrode side-reaction rate and the lithium loss rate. Therefore, at the point when the positive electrode side-reaction rate is calculated, the discharging profile represents the current state of the battery more accurately than the charging profile. That is, as of the point when the positive electrode side-reaction rate is calculated, the point when the last charging profile was obtained is earlier than the point when the last discharging profile was obtained. Thus, by calculating the lithium loss rate of the battery based on the discharging profile and subsequently calculating the positive electrode side-reaction rate based on it, the battery's current state may be diagnosed more accurately.

The control unit 130 may be configured to set usage conditions for the battery based on at least one of the positive electrode side-reaction rate, the negative electrode side-reaction rate, and the lithium loss rate.

The positive electrode side-reaction rate, the negative electrode side-reaction rate, and the lithium loss rate are indicators that represent the degree of battery degradation. For example, as the battery degrades, the positive electrode side-reaction rate, the negative electrode side-reaction rate, and the lithium loss rate increase. Therefore, the control unit 130 may appropriately set usage conditions related to battery degradation based on at least one of the positive electrode side-reaction rate, the negative electrode side-reaction rate, and the lithium loss rate.

The control unit 130 may compare at least one of the positive electrode side-reaction rate, the negative electrode side-reaction rate, and the lithium loss rate with a preset reference value and may set the usage conditions of the battery based on the comparison result.

In an embodiment, the control unit 130 may compare the positive electrode side-reaction rate with a first reference value preset to correspond to the positive electrode side-reaction rate. When the positive electrode side-reaction rate is equal to or greater than the first reference value, the control unit 130 may change the usage conditions of the battery. Conversely, when the positive electrode side-reaction rate is less than the first reference value, the control unit 130 may not change the usage conditions of the battery.

In another embodiment, the control unit 130 may compare the negative electrode side-reaction rate with a second reference value preset to correspond to the negative electrode side-reaction rate. When the negative electrode side-reaction rate is equal to or greater than the second reference value, the control unit 130 may change the usage conditions of the battery. Conversely, if the negative electrode side-reaction rate is less than the second reference value, the control unit 130 may not change the usage conditions of the battery.

In yet another embodiment, the control unit 130 may compare the lithium loss rate with a third reference value preset to correspond to the lithium loss rate. When the lithium loss rate is equal to or greater than the third reference value, the control unit 130 may change the usage conditions of the battery. Conversely, when the lithium loss rate is less than the third reference value, the control unit 130 may not change the usage conditions of the battery.

The control unit 130 may change the usage conditions as follows when the calculated positive electrode side-reaction rate, the negative electrode side-reaction rate, and the lithium loss rate each exceed their respective reference values. For example, the control unit 130 may adjust the charge-discharge rate (C-rate) range for the battery. For example, the control unit 130 may reduce the upper limit of the charge-discharge rate range for the battery. In another example, the control unit 130 may increase the lower limit of the charge-discharge rate range for the battery. In yet another example, the control unit 130 may reduce the upper limit and may increase the lower limit of the charge-discharge rate range for the battery.

Alternatively, the control unit 130 may adjust the available SOC range for the battery. For example, the control unit 130 may reduce the upper limit of the available SOC range for the battery. In another example, the control unit 130 may increase the lower limit of the available SOC range for the battery. In yet another example, the control unit 130 may reduce the upper limit and increase the lower limit of the available SOC range for the battery.

The battery managing apparatus 100 according to an embodiment of the present disclosure may prevent or suppress battery degradation or the acceleration of degradation by appropriately setting the usage conditions of the battery based on at least one of the calculated positive electrode side-reaction rate, negative electrode side-reaction rate, and lithium loss rate. In addition, by performing non-destructive diagnostics of the degree of degradation after using the battery for a certain period and making necessary adjustments based on the results, the safety of the battery may also be substantially improved.

Hereinafter, an embodiment will be described in which the profile determination unit 120 adjusts the reference positive electrode profile and the reference negative electrode profile to correspond to the battery profile and determines the positive electrode profile and the negative electrode profile of the battery.

Figure 4:
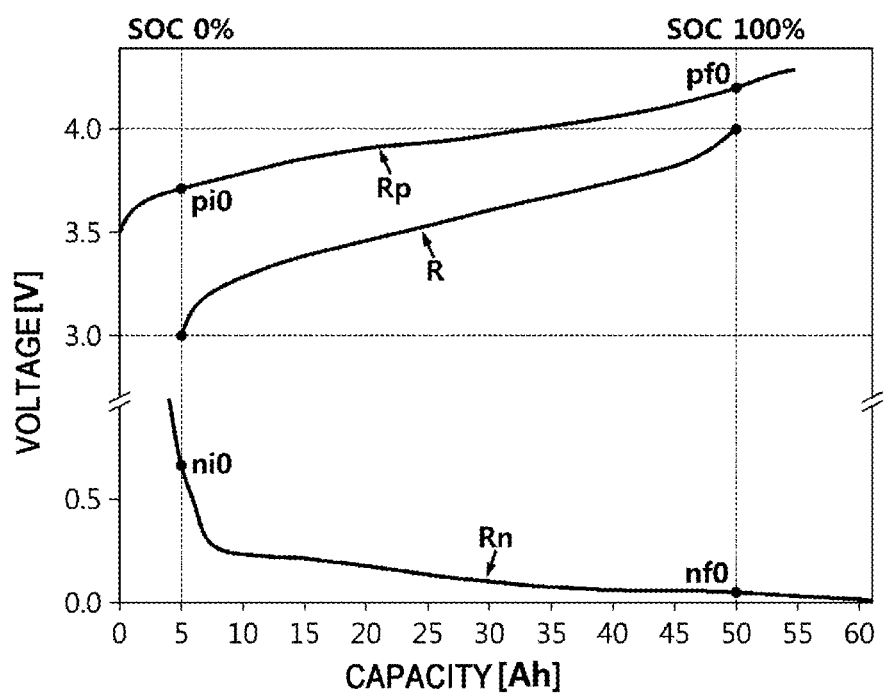
FIG. 4 is a view schematically illustrating a reference positive electrode profile and a reference negative electrode profile of a battery, according to an embodiment of the present disclosure.

FIG. 4 schematically illustrates a reference positive electrode profile Rp and a reference negative electrode profile Rn according to an embodiment of the positive disclosure. In the embodiment of FIG. 4, the horizontal axis (the X-axis) represents capacity (Ah), and the vertical axis (the Y-axis) represents voltage (V).

Figure 5:
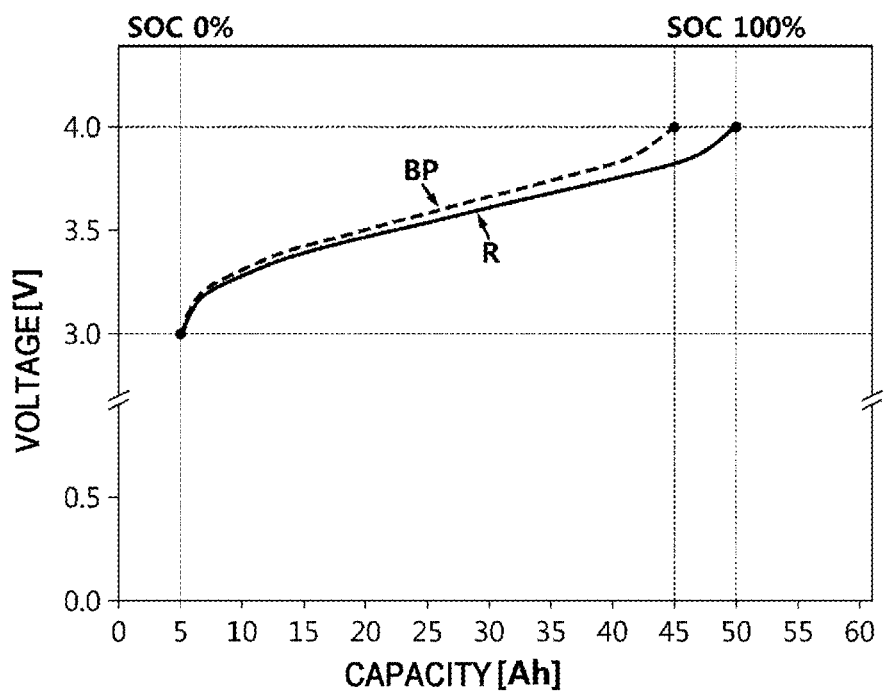
FIG. 5 is a view schematically illustrating a battery profile and a reference profile of a battery, according to an embodiment of the present disclosure.

FIG. 5 schematically illustrates a battery profile BP and a reference profile R according to an embodiment of the present disclosure. In the embodiment of FIG. 5, the horizontal axis (the X-axis) represents capacity (Ah), and the vertical axis (the Y-axis) represents voltage (V).

The profile determination unit 120 may be configured to compare the battery profile BP with at least one comparison profile. Here, the "comparison profile" may refer to a result obtained by adjusting each of the reference positive electrode profile Rp and the reference negative electrode profile Rn stored in the storage unit 140 to generate an adjusted positive electrode profile and an adjusted negative electrode profile, and then synthesizing (combining) the adjusted positive electrode profile and the adjusted negative electrode profile.

For example, when the reference profile R is a result obtained by subtracting a portion of the reference negative electrode profile Rn from a portion of the reference positive electrode profile Rp, the comparison profile may be a result obtained by subtracting a portion of the adjusted negative electrode profile from a portion of the adjusted positive electrode profile.

The profile determination unit 120 may directly adjust the reference positive electrode profile Rp and the reference negative electrode profile Rn to generate at least one comparison profile. Alternatively, the at least one comparison profile may be pre-obtained based on the reference positive electrode profile Rp and the reference negative electrode profile Rn and stored in the storage unit 140. In this case, the profile determination unit 120 may obtained the comparison profile by accessing the storage unit 140 and reading the comparison profile.

The profile determination unit 120 may generate a plurality of comparison profiles from the reference positive electrode profile Rp and the reference negative electrode profile Rn by repeating an adjustment procedure of adjusting each of the reference positive electrode profile Rp and the reference negative electrode profile Rn at multiple levels and then synthesizing them. The "comparison profiles" may also be referred to as "adjusted reference profiles."

The profile determination unit 120 may identify one comparison profile among the plurality of comparison profiles that has the smallest error with respect to the battery profile BP.

Subsequently, the profile determination unit 120 may determine that the adjusted positive electrode profile and the adjusted negative electrode profile mapped to the identified comparison profile are the positive electrode profile and the negative electrode profile of the battery.

In this regard, various methods known at the time of filing the present disclosure may be employed to determine the error between two profiles each capable of being represented in a two-dimensional coordinate system. For example, the integral value of the absolute value of the area between the two profiles or a root mean square error (RMSE) may be used as the error between the two profiles.

According to this configuration of the present disclosure, various state information of the battery may ultimately be obtained based on the finally determined positive electrode profile and negative electrode profile. The finally determined positive electrode profile and negative electrode profile may be mapped to the comparison profile which is mapped with the minimum error. In particular, the comparison profile based on the finally determined positive electrode profile and negative electrode profile may be said to closely match the battery profile BP in, for example, shape.

Therefore, according to the present disclosure, the positive electrode profile and negative electrode profile of a battery may be obtained non-destructively. Accordingly, when the battery is a new battery, the positive electrode profile and negative electrode profile of the battery may be analyzed to more easily diagnose, for example, whether a defect has occurred in the battery, and if a defect has occurred, what type of defect it is.

When the battery is in use after being verified as a non-defective product, the positive electrode profile and negative electrode profile of the battery may be used to identify the extent of degradation of the battery for each degradation factor.

Furthermore, according to an embodiment of the present disclosure, the positive electrode profile and negative electrode profile of the battery may be obtained in a relatively simple manner. For example, even when only one reference positive electrode profile Rp and one reference negative electrode profile Rn are stored in the storage unit 140, the implementation of the present disclosure may still be feasible. Therefore, there is no need for a high storage capacity of the storage unit 140, and there is no need for numerous pre-tests required to secure multiple reference positive electrode profiles Rp and/or multiple reference negative electrode profiles Rn.

Figure 6:
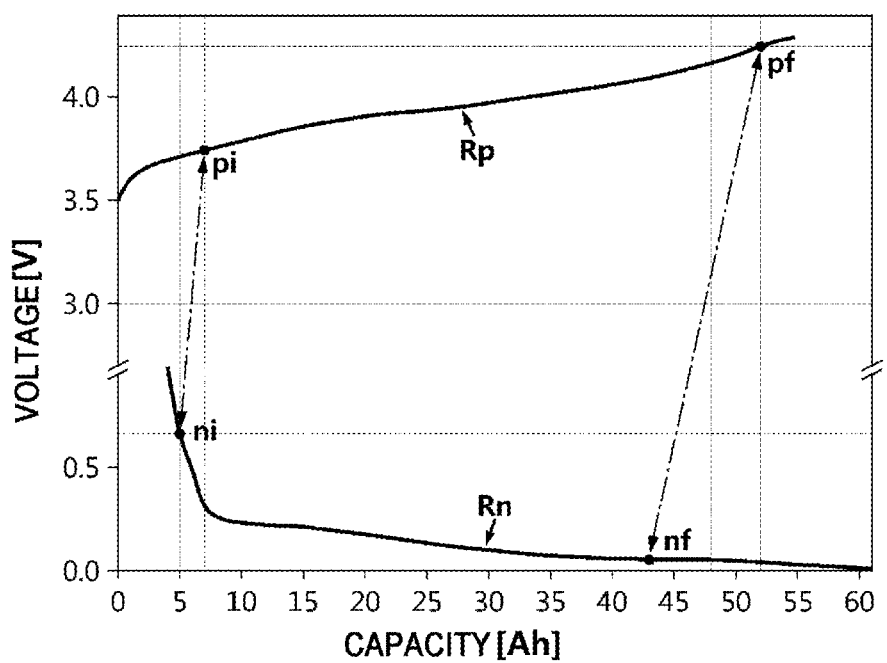
FIGS. 6 to 8 are diagrams referenced to describe an example of a procedure for generating a comparison profile used for comparison with a battery profile, according to an embodiment of the present disclosure.
Figure 7:
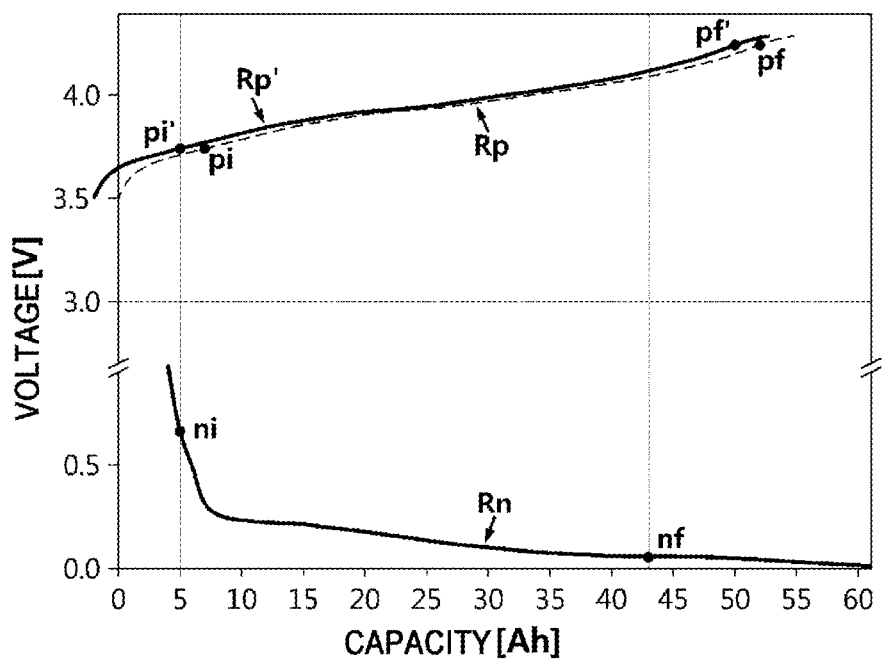
Figure 8:
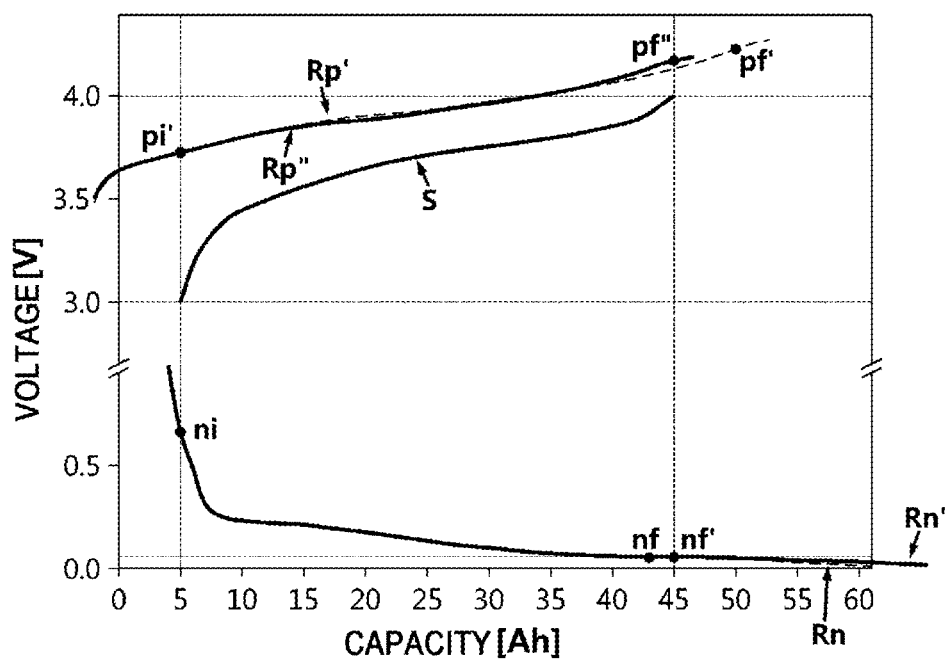

FIGS. 6 to 8 are diagrams referenced to describe an example of a procedure for generating a comparison profile S used for comparison with the battery profile BP according to an embodiment of the present disclosure.

The procedure for generating the comparison profile S, which will be described with reference to FIGS. 6 to 8, proceeds in the following order: a first routine for setting four points (positive electrode activation onset point pi, positive electrode activation endpoint pf, negative electrode activation onset point ni, and negative electrode activation endpoint nf) to correspond to the voltage range of interest (see FIG. 6); a second routine for performing profile shifting (see FIG. 7); and a third routine for performing capacity scaling (see FIG. 8). That is, the procedure for generating the comparison profile S according to an embodiment of the present disclosure includes the first to third routines.

First, referring to FIG. 6, the reference positive electrode profile Rp and the reference negative electrode profile Rn are the same as those illustrated in FIG. 4.

The profile determination unit 120 determines the positive electrode activation onset point pi, the positive electrode activation endpoint pf, the negative electrode activation onset point ni, and the negative electrode activation endpoint nf on the reference positive electrode profile Rp and the reference negative electrode profile Rn. Either the positive electrode activation onset point pi or the negative electrode activation onset point ni depends on the other.

According to an embodiment, the difference in voltage between the positive electrode activation onset point pi and the negative electrode activation onset point ni may be set to be the same as the initial voltage (the lowest voltage) of the battery profile BP.

As an example, the profile determination unit 120 may divide the positive electrode voltage range from the start point to the end point of the reference positive electrode profile Rp into multiple fine voltage sections and then set the boundary point between two adjacent fine voltage sections among the multiple fine voltage sections as the positive electrode activation onset point pi. Each fine voltage section may have a predetermined size (e.g., 0.01 V). Subsequently, the profile determination unit 120 may set a point on the reference negative electrode profile Rn that is smaller by a first set voltage (e.g., 3 V) than the voltage of the positive electrode activation onset point pi as the negative electrode activation onset point ni.

As another example, the profile determination unit 120 may divide the negative electrode voltage range from the start point to the end point of the reference negative electrode profile Rn into multiple fine voltage sections with a predetermined size and then set the boundary point between two adjacent fine voltage sections among the multiple fine voltage sections as the negative electrode activation onset point ni. Subsequently, the profile determination unit 120 may set a point on the reference positive electrode profile Rp that is larger by the first set voltage than the voltage of the negative electrode activation onset point ni as the positive electrode activation onset point pi.

Either the positive electrode activation endpoint pf or the negative electrode activation endpoint nf depends on the other.

According to an embodiment, the difference in voltage between the positive electrode activation endpoint pf and the negative electrode activation endpoint nf may be set to be the same as the final voltage (the highest voltage) of the battery profile BP.

As an example, the profile determination unit 120 may divide the positive electrode voltage range from a second set voltage to the end point of the reference positive electrode profile Rp into multiple fine voltage sections with a predetermined size and then set the boundary point between two adjacent fine voltage sections among the multiple fine voltage sections as the positive electrode activation endpoint pf. Subsequently, the profile determination unit 120 may set a point on the reference negative electrode profile Rn that is smaller by the second set voltage (e.g., 4 V) than the voltage of the positive electrode activation endpoint pf as the negative electrode activation endpoint nf.

As another example, the profile determination unit 120 may divide the negative electrode voltage range from the start point to the end point of the reference negative electrode profile Rn into multiple fine voltage sections with a predetermined size and then set the boundary point between two adjacent fine voltage sections among the multiple fine voltage sections as the negative electrode activation endpoint nf. Subsequently, the profile determination unit 120 may set a point on the reference positive electrode profile Rp that is larger by the second set voltage than the voltage of the negative electrode activation endpoint nf as the positive electrode activation endpoint pf.

Once the determination of the positive electrode activation onset point pi, the positive electrode activation endpoint pf, the negative electrode activation onset point ni, and the negative electrode activation endpoint nf is completed, the profile determination unit 120 shifts at least one of the reference positive electrode profile Rp and the reference negative electrode profile Rn to the left or right along the horizontal axis.

According to an embodiment, the difference between the capacity value of the positive electrode activation onset point pi and the capacity value of the positive electrode activation endpoint pf, the difference between the capacity value of the negative electrode activation onset point ni and the capacity value of the negative electrode activation endpoint nf, and the difference between the start capacity and the end capacity of the battery profile BP may all be set to be the same.

Referring to FIG. 7, for example, the profile determination unit 120 may shift the reference positive electrode profile Rp to the left (lower capacity side), shift the reference negative electrode profile Rn to the right (higher capacity side), or perform both, so that the capacity values of the positive electrode activation onset point pi and the negative electrode activation onset point ni match.

As another example, the profile determination unit 120 may shift the reference positive electrode profile Rp to the left, shift the reference negative electrode profile Rn to the right, or perform both, so that the capacity values of the positive electrode activation endpoint pf and the negative electrode activation endpoint nf match.

FIG. 7 illustrates a situation in which, as a result of generating an adjusted positive electrode profile Rp' by shifting only the reference positive electrode profile Rp to the left, the capacity value of the positive electrode activation onset point pi' matches the capacity value of the negative electrode activation onset point ni. The adjusted positive electrode profile Rp' is the result of applying an adjustment procedure to the reference positive electrode profile Rp to shift it to the left by the difference in capacity values between the positive electrode activation onset point pi and the negative electrode activation onset point ni. Therefore, the two points pi and pi' differ only in their capacity values, while their voltages are the same. Similarly, the two points pf and pf differ only in their capacity values, while their voltages are the same.

Once the profiles Rp' and Rn are obtained by shifting at least one of the reference positive electrode profile Rp and the reference negative electrode profile Rn, the profile determination unit 120 scales the capacity range of at least one of the obtained profiles Rp' and Rn.

According to an embodiment, capacity scaling may be performed such that the capacity range between the positive electrode activation onset point and the positive electrode activation endpoint of the adjusted positive electrode profile Rp', the capacity range between the negative electrode activation onset point and the negative electrode activation endpoint of the adjusted negative electrode profile Rn, and the capacity range of the battery profile BP are the same.

According to the example illustrated in FIG. 8, the profile determination unit 120 performs an additional adjustment procedure (capacity scaling) to contract or expand at least one of the adjusted positive electrode profile Rp' and the reference negative electrode profile Rn along the horizontal axis. That is, the capacity range of the adjusted positive electrode profile Rp' may be contracted or expanded while maintaining its the voltage range constant. Alternatively, the capacity range of the reference negative electrode profile Rn may be contracted or expanded while maintaining its voltage range constant.

Referring to FIG. 8, the profile determination unit 120 may generate an adjusted positive electrode profile Rp" by contracting or expanding the adjusted positive electrode profile Rp' such that the capacity range between the two points pi' and pf of the adjusted positive electrode profile Rp' matches the capacity range of the battery profile BP. At this time, one of the two points pi' and pf, for example, the point pi', may be fixed. As a result, the capacity range between the two points pi' and pf" of the adjusted positive electrode profile Rp" may match the capacity range of the battery profile BP.

In addition, the profile determination unit 120 may generate an adjusted negative electrode profile Rn' by contracting or expanding the reference negative electrode profile Rn such that the capacity range between the two points ni and nf of the reference negative electrode profile Rn matches the capacity range of the battery profile BP. At this time, one of the two points ni and nf, for example, the point ni, may be fixed. As a result, the capacity range between the two points ni and nf of the adjusted negative electrode profile Rn' may match the capacity range of the battery profile BP.

In FIG. 8, the adjusted positive electrode profile Rp" is the result of contracting the adjusted positive electrode profile Rp', illustrated in FIG. 7, along the capacity axis, and the adjusted negative electrode profile Rn' is the result of expanding the reference negative electrode profile Rn, illustrated in FIG. 7, along the capacity axis.

The positive electrode activation endpoint pf' on the adjusted positive electrode profile Rp" corresponds to the positive electrode activation endpoint pf on the adjusted positive electrode profile Rp'. The negative electrode activation endpoint nf on the adjusted negative electrode profile Rn' corresponds to the negative electrode activation endpoint nf on the reference negative electrode profile Rn.

The capacity range between the positive electrode activation onset point pi' and the positive electrode activation endpoint pf" of the adjusted positive electrode profile Rp" matches the capacity range of the battery profile BP. Similarly, the capacity range between the negative electrode activation onset point ni and the negative electrode activation endpoint nf of the adjusted negative electrode profile Rn' matches the capacity range of the battery profile BP.

In addition, the capacity range between the two points pi' and p" of the adjusted positive electrode profile Rp" matches the capacity range between the two points ni and nf of the adjusted negative electrode profile Rn'. The profile determination unit 120 may generate a comparison profile S by subtracting the profile between the two points pi' and pf" of the adjusted negative electrode profile Rp" from the profile between the two points ni and nf of the adjusted negative electrode profile Rn'.

The profile determination unit 120 may calculate the error (profile error) between the comparison profile S and the battery profile BP.

The profile determination unit 120 may map at least two of the adjusted positive electrode profile Rp", the adjusted negative electrode profile Rn', the positive electrode activation onset point pi', the positive electrode activation endpoint pf, the negative electrode activation onset point ni, the negative electrode activation endpoint nf, the first scaling factor, the second scaling factor, the comparison profile S, and the profile error to each other and record them in the storage unit 140. The first scaling factor may represent the ratio of the capacity difference between two points pi' and pf" to the capacity difference between two points pi0 and pf0. The second scaling factor may represent the ratio of the capacity difference between two points ni' and nf" to the capacity difference between two points ni0 and nf0.

The profile determination unit 120 may calculate a positive electrode modification rate ps based on the reference positive electrode profile Rp and the adjusted positive electrode profile Rp". Here, the positive electrode modification rate ps refers to the rate at which the adjusted positive electrode profile is modified relative to the reference positive electrode profile. The profile determination unit 120 may also calculate a negative electrode modification rate ns based on the reference negative electrode profile Rn and the adjusted positive electrode profile Rn'. Here, the negative electrode modification rate ns refers to the rate at which the adjusted negative electrode profile is modified relative to the reference negative electrode profile.

For example, the profile determination unit 120 may determine the first scaling factor as the positive electrode modification rate ps and the second scaling factor as the negative electrode modification rate ns.

As described above, when the positive electrode voltage range of the reference positive electrode profile Rp is divided into multiple fine voltage sections, the boundary point between two adjacent fine voltage sections among the multiple fine voltage sections may be set as the positive electrode activation onset point pi.

For example, when the positive electrode voltage range of the reference positive electrode profile Rp is divided into 100 fine voltage sections, there may be 100 boundary points capable of being set as the positive electrode activation onset point pi. In addition, when the voltage range of the reference positive electrode profile Rp that is equal to or greater than the second predetermined voltage is divided into 40 fine voltage sections, there may be 40 boundary points capable of being set as the positive electrode activation endpoint pf. In this case, up to 4,000 different comparison profiles may be generated.

Of course, it will be readily understood by those skilled in the art that as the size of the fine voltage sections decreases, the maximum number of comparison profiles capable of being generated increases, and conversely, as the size of the fine voltage sections increases, the maximum number of comparison profiles capable of being generated decreases.

The profile determination unit 120 may identify the minimum value among the profile errors of multiple comparison profiles generated as described above, and then obtain information mapped to the minimum profile error (e.g., at least one of the positive electrode activation onset point, the positive electrode activation endpoint, the negative electrode activation onset point, the negative electrode activation endpoint, the first scaling factor, or the second scaling factor) from the storage unit 140.

Figure 9:
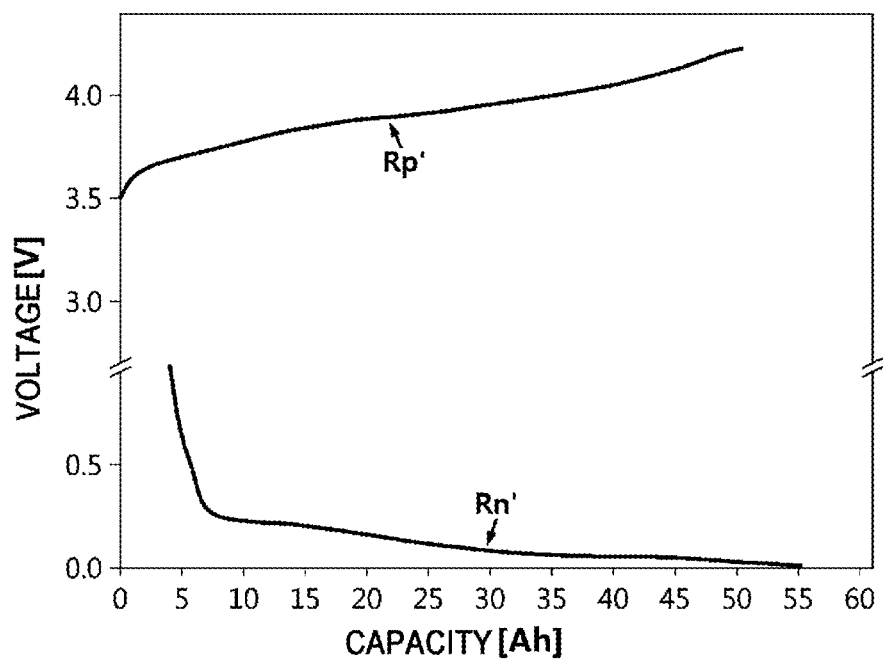
FIGS. 9 to 11 are diagrams referenced to describe another example of a procedure for generating a comparison profile used for comparison with a battery profile, according to an embodiment of the present disclosure.
Figure 10:
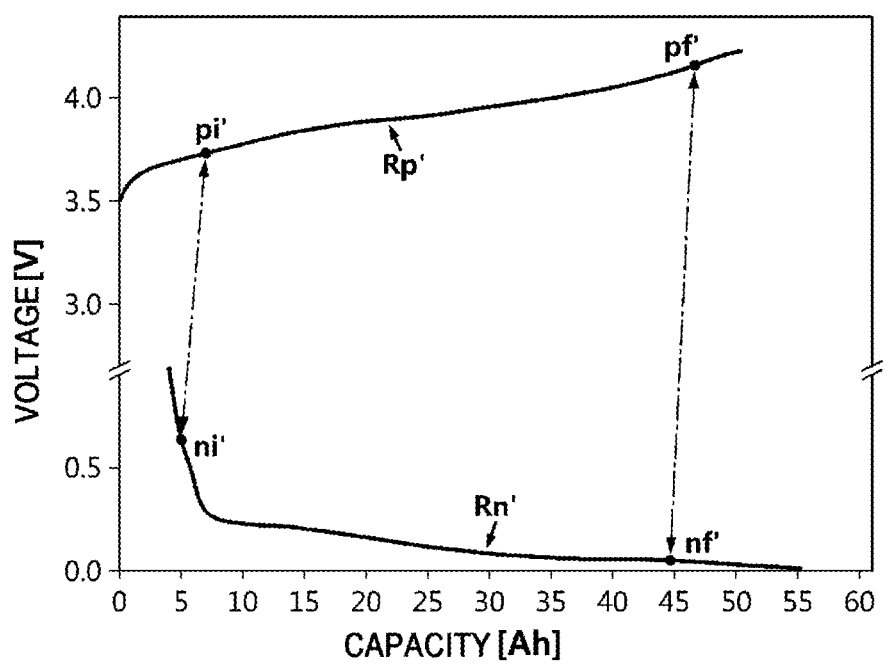
Figure 11:
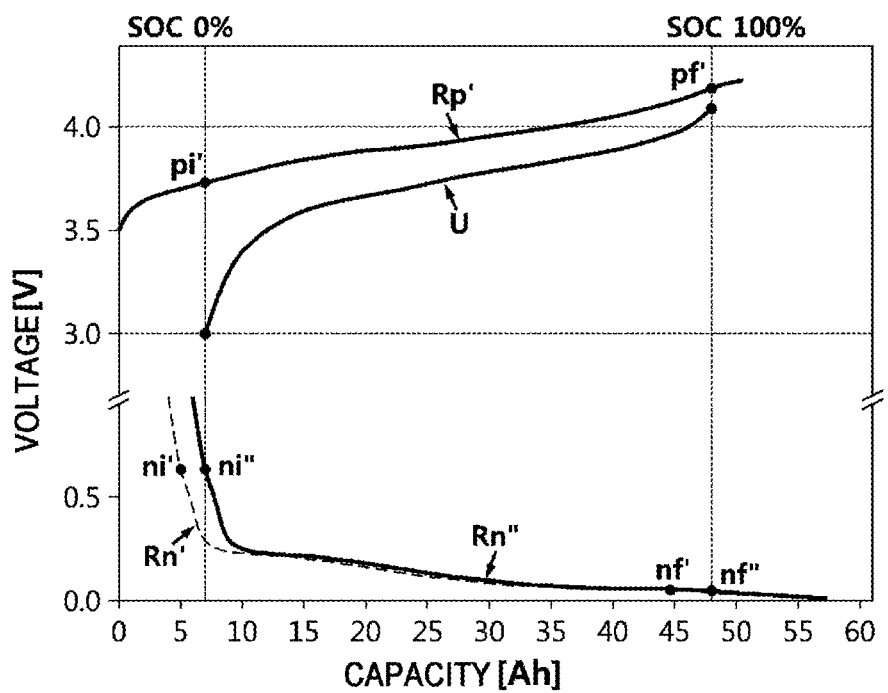

FIGS. 9 to 11 are diagrams referenced to describe another example of a procedure for generating a comparison profile U used for comparison with the battery profile BP according to an embodiment of the present disclosure. For reference, the embodiment of FIGS. 9 to 11 is independent of the embodiment of FIGS. 6 to 8. Therefore, the terms or symbols commonly described for explaining the embodiments of FIGS. 6 to 8 and FIGS. 9 to 11 should be understood as being limited to their respective embodiments.

The procedure for generating the comparison profile U, which will be described with reference to FIGS. 9 to 11, proceeds in the following order: a fourth routine for performing capacity scaling (see FIG. 9): a fifth routine for setting four points (positive electrode activation onset point, positive electrode activation endpoint, negative electrode activation onset point, and negative electrode activation endpoint) (see FIG. 10); and a sixth routine for performing profile shifting (see FIG. 11). That is, the procedure for generating the comparison profile U according to another embodiment of the present disclosure includes the fourth to sixth routines.

First, referring to FIG. 9, the reference positive electrode profile Rp and the reference negative electrode profile Rn are the same as those illustrated in FIG. 4.

The profile determination unit 120 applies a first scaling factor and a second scaling factor, selected from a scaling value range, to the reference positive electrode profile Rp and the reference negative electrode profile Rn, respectively, to generate an adjusted positive electrode profile Rp' and an adjusted negative electrode profile Rn'.

The scaling value range may be predetermined or may vary depending on the ratio of the size of the capacity range of the battery profile BP to the size of the capacity range of a reference profile R. For example, when the first scaling factor and the second scaling factor may be selected from values in the scaling value range (e.g., 90% to 99%) at intervals of 0.1% (i.e., 90%, 90.1%, 90.2%, . . . , 98.9%, 99%), a total of 91 values may be selected as the first scaling factor and the second scaling factor, respectively. In this case, a maximum of 8,281 adjusted profiled pairs may be generated according to the 91×91=8,281 adjustment levels (combinations of the first scaling factor and the second scaling factor). The adjusted profile pairs refer to combinations of adjusted positive electrode profiles and adjusted negative electrode profiles.

The adjusted positive electrode profile Rp' and the adjusted negative electrode profile Rn' illustrated in FIG. 9 illustrate the results of applying the first scaling factor and the second scaling factor, each of which is less than 100%, to the reference positive electrode profile Rp and the reference negative electrode profile Rn, respectively.

Since the first scaling factor and the second scaling factor are less than 100%, the adjusted positive electrode profile Rp' is obtained by contracting the reference positive electrode profile Rp along the horizontal axis, and the adjusted negative electrode profile Rn' is also obtained by contracting the reference negative electrode profile Rn along the horizontal axis. To help understanding, the example illustrates the positive electrode profile Rp and the reference negative electrode profile Rn with only their remaining portions contracted to the left along the horizontal axis, while fixing the starting points of respective profiles.

Referring to FIG. 10, the profile determination unit 120 determines the positive electrode activation onset point pi', the positive electrode activation endpoint pf, the negative electrode activation onset point ni', and the negative electrode activation endpoint nf on the adjusted positive electrode profile Rp' and the adjusted negative electrode profile Rn'.

Either the positive electrode activation onset point pi' or the negative electrode activation onset point ni' may depend on the other. In addition, either the positive electrode activation endpoint pf or the negative electrode activation endpoint nf may depend on the other. Furthermore, either the positive electrode activation onset point pi' or the positive electrode activation endpoint pf may be set based on the other.

That is, once one of the positive electrode activation onset point pi', the positive electrode activation endpoint pf, the negative electrode activation onset point ni', and the negative electrode activation endpoint nf is set, the remaining three points may be automatically determined by the first predetermined voltage, the second predetermined voltage, and/or the size of the capacity range of the battery profile BP (e.g., the charging capacity for SOC 0 to 100%).

As an example, the profile determination unit 120 may divide the positive electrode voltage range from the start point to the end point (or a second set voltage) of the adjusted positive electrode profile Rp' into multiple fine voltage sections, and then set the boundary point between two adjacent fine voltage sections among the multiple fine voltage sections as the positive electrode activation onset point pi'. Subsequently, the profile determination unit 120 may set a point on the adjusted negative electrode profile Rn that is smaller by the first set voltage (e.g., 3 V) than the voltage of the positive electrode activation onset point pi' as the negative electrode activation onset point ni'.

As another example, the profile determination unit 120 may divide the negative electrode voltage range from the start point to the end point of the adjusted negative electrode profile Rn' into multiple fine voltage sections with a predetermined size and then set the boundary point between two adjacent fine voltage sections among the multiple fine voltage sections as the negative electrode activation onset point ni'. Subsequently, the profile determination unit 120 may set a point on the adjusted positive electrode profile Rp' that is larger by the first predetermined voltage than the voltage of the negative electrode activation onset point ni' as the positive electrode activation onset point pi'.

As another example, the profile determination unit 120 may divide the voltage range from the second set voltage to the end point of the adjusted positive electrode profile Rp' into multiple fine voltage sections with a predetermined size and then set the boundary point between two adjacent fine voltage sections among the multiple fine voltage sections as the positive electrode activation endpoint pf. Subsequently, the profile determination unit 120 may set a point on the adjusted negative electrode profile Rn that is smaller by the second set voltage (e.g., 4 V) than the voltage of the positive electrode activation endpoint pf as the negative electrode activation endpoint nf.

As another example, the profile determination unit 120 may divide the negative electrode voltage range from the start point to the end point of the adjusted negative electrode profile Rn' into multiple fine voltage sections with a predetermined size and then set the boundary point between two adjacent fine voltage sections among the multiple fine voltage sections as the negative electrode activation endpoint nf. Subsequently, the profile determination unit 120 may set a point on the adjusted positive electrode profile Rp' that is larger by the second set voltage than the voltage of the negative electrode activation endpoint nf as the positive electrode activation endpoint pf.

When one of the positive electrode activation onset point pi', the positive electrode activation endpoint pf, the negative electrode activation onset point ni', and the negative electrode activation endpoint nf is determined, the profile determination unit 120 may additionally determine the remaining three points based on the determined point.

As an example, when the positive electrode activation onset point pi' is determined first, the profile determination unit 120 may set a point on the adjusted positive electrode profile Rp' that has a capacity value larger by the size of the capacity range of the battery profile BP than the capacity value of the positive electrode activation onset point pi' as the positive electrode activation endpoint pf. In addition, the profile determination unit 120 may search for a point on the adjusted negative electrode profile Rn' that is lower by the first set voltage than the voltage of the positive electrode activation onset point pi' and may set the searched point as the negative electrode activation onset point ni'. Furthermore, the profile determination unit 120 may set a point on the adjusted negative electrode profile Rn' that has a capacity value larger by the size of the capacity range of the battery profile BP than the capacity value of the negative electrode activation onset point ni' as the negative electrode activation endpoint nf.

As an example, when the positive electrode activation endpoint pf is determined first, the profile determination unit 120 may set a point on the adjusted positive electrode profile Rp' that has a capacity value smaller by the size of the capacity range of the battery profile BP than the capacity value of the positive electrode activation endpoint pf as the positive electrode activation onset point pi'. In addition, the profile determination unit 120 may search for a point on the adjusted negative electrode profile Rn' that is lower by the first set voltage than the voltage of the positive electrode activation endpoint pf and may set the searched point as the negative electrode activation endpoint nf'. Furthermore, the profile determination unit 120 may set a point on the adjusted negative electrode profile Rn' that has a capacity value smaller by the size of the capacity range of the battery profile BP than the capacity value of the negative electrode activation endpoint nf as the negative electrode activation onset point ni'.

As another example, when the negative electrode activation onset point ni' is determined, the profile determination unit 120 may set a point on the adjusted negative electrode profile Rn' that has a capacity value larger by the size of the capacity range of the battery profile BP than the capacity value of the negative electrode activation onset point ni' as the negative electrode activation endpoint nf. In addition, the profile determination unit 120 may search for a point on the adjusted positive electrode profile Rp' that is higher by the first set voltage than the voltage of the negative electrode activation onset point ni' and may set the searched point as the positive electrode activation onset point pi'. Furthermore, the profile determination unit 120 may set a point on the adjusted positive electrode profile Rp' that has a capacity value larger by the size of the capacity range of the battery profile BP than the capacity value of the positive electrode activation onset point pi' as the positive electrode activation endpoint pf.

As another example, when the negative electrode activation endpoint nf is determined, the profile determination unit 120 may set a point on the adjusted negative electrode profile Rn' that has a capacity value smaller by the size of the capacity range of the battery profile BP than the capacity value of the negative electrode activation endpoint nf as the negative electrode activation onset point ni'. In addition, the profile determination unit 120 may search for a point on the adjusted positive electrode profile Rp' that is higher by the second set voltage than the voltage of the negative electrode activation endpoint nf and may set the searched point as the positive electrode activation endpoint pf. Furthermore, the profile determination unit 120 may set a point on the adjusted positive electrode profile Rp' that has a capacity value smaller by the size of the capacity range of the battery profile BP than the capacity value of the positive electrode activation endpoint pf as the positive electrode activation onset point pi'.

Once the determination of the positive electrode activation onset point pi', the positive electrode activation endpoint pf, the negative electrode activation onset point ni', and the negative electrode activation endpoint nf, is completed based on the pair of the first scaling factor and the second scaling factor, the profile determination unit 120 may shift at least one of the adjusted positive electrode profile Rp' and the adjusted negative electrode profile Rn' to the left or right along the horizontal axis such that the capacity values of the positive electrode activation onset point pi' and the negative electrode activation onset point ni' match, or the capacity values of the positive electrode activation endpoint pf and the negative electrode activation endpoint nf match.

The adjusted negative electrode profile Rn" illustrated in FIG. 11 is obtained by shifting only the adjusted negative electrode profile Rn' illustrated in FIG. 10 to the right. As a result, the capacity values of the positive electrode activation onset point pi' and the negative electrode activation onset point ni" match each other. In this regard, since the capacity difference between the positive electrode activation onset point pi' and the positive electrode activation endpoint pf is the same as the capacity difference between the negative electrode activation onset point ni' and the negative electrode activation endpoint nf, when the capacity values of the positive electrode activation onset point pi' and the negative electrode activation onset point ni" match each other, the capacity values of the positive electrode activation endpoint pf and the negative electrode activation endpoint nf" also match each other.

Referring to FIG. 11, the profile determination unit 120 may generate a comparison profile U by subtracting the partial profile between the two points pi' and pf" of the adjusted negative electrode profile Rp' from the partial profile between the two points ni" and nf' of the adjusted negative electrode profile Rn".

The profile determination unit 120 may calculate the error (profile error) between the comparison profile U and the battery profile BP.

The profile determination unit 120 may map at least two of the adjusted positive electrode profile Rp', the adjusted negative electrode profile Rn", the positive electrode activation onset point pi', the positive electrode activation endpoint pf, the negative electrode activation onset point ni", the negative electrode activation endpoint nf', the first scaling factor, the second scaling factor, the comparison profile U, and the profile error to each other and record them in the storage unit 140.

The profile determination unit 120 may calculate a positive electrode modification rate ps based on the reference positive electrode profile Rp and the adjusted positive electrode profile Rp'. Here, the positive electrode modification rate ps refers to the rate at which the adjusted positive electrode profile is modified relative to the reference positive electrode profile. The profile determination unit 120 may also calculate a negative electrode modification rate ns based on the reference negative electrode profile Rn and the adjusted positive electrode profile Rn". Here, the negative electrode modification rate ns refers to the rate at which the adjusted negative electrode profile is modified relative to the reference negative electrode profile.

For example, the profile determination unit 120 may determine the first scaling factor as the positive electrode modification rate ps and the second scaling factor as the negative electrode modification rate ns.

As described above, the profile determination unit 120 may generate a corresponding comparison profile for each pair of the first scaling factor and the second scaling factor selected from the scaling value range. Since there are multiple pairs of the first scaling factor and the second scaling factor, it is obvious that multiple comparison profiles will also be generated. The profile determination unit 120 may identify the minimum value among the profile errors of the multiple comparison profiles and may then obtain the information mapped to the minimum profile error from the storage unit 140.

The battery managing apparatus 100 according to the present disclosure may be applied to a battery managing system (BMS). That is, the BMS according to the present disclosure may include the aforementioned battery managing apparatus 100. In this configuration, at least some of the components of the battery managing apparatus 100 may be implemented by supplementing or adding functionalities to components included in conventional BMSs. For example, the profile acquisition unit 110, the profile determination unit 120, the control unit 130, and the storage unit 140 of the battery managing device 100 may be implemented as components of the BMS.

In addition, the battery managing apparatus 100 according to the present disclosure may be provided in a battery pack. That is, a battery pack according to the present disclosure may include the aforementioned battery managing apparatus 100 and one or more battery cells. The battery pack may further include electrical components (e.g., a relay and a fuse) and a case.

Figure 12:
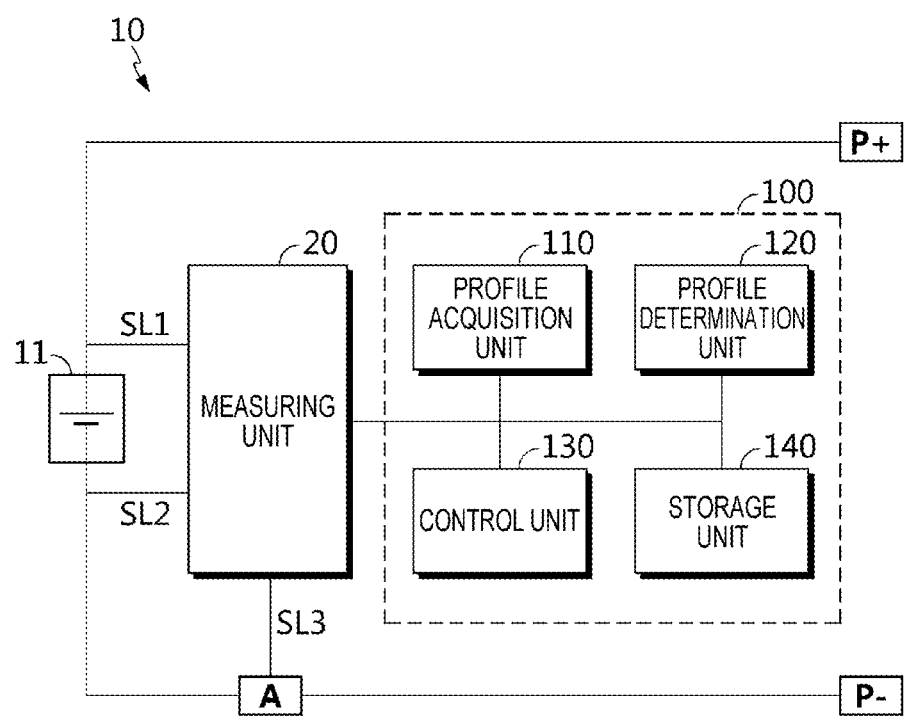
FIG. 12 is a view illustrating a configuration of a battery pack, according to another embodiment of the present disclosure.

FIG. 12 illustrates a configuration of a battery pack 10 according to another embodiment of the present disclosure.

The positive terminal of a battery 11 may be connected to the positive terminal P+ of the battery pack 10, and the negative terminal of the battery 11 may be connected to the negative terminal P− of the battery pack 10.

A measuring unit 20 may be connected to a first sensing line SL1, a second sensing line SL2, and a third sensing line SL3. For example, the measuring unit 20 may be connected to the positive terminal of the battery 11 via the first sensing line SL1 and to the negative terminal of the battery 11 via the second sensing line SL2. The measuring unit 20 may measure the voltage of the battery 11 based on the voltages measured from the first sensing line SL1 and the second sensing line SL2, respectively.

In addition, the measuring unit 20 may be connected to a current measuring unit A via the third sensing line SL3. For example, the current measuring unit A may be an ammeter or a shunt resistor capable of measuring the charging current and discharging current of the battery 11. The measuring unit 20 may measure the charging current of the battery 11 via the third sensing line SL3 and calculate the amount of charge. In addition, the measuring unit 20 may measure the discharging current of the battery 11 via the third sensing line SL3 and calculate the amount of discharge.

An external device (not illustrated) may have one terminal connected to the positive terminal P+ of the battery pack 10 and the other terminal connected to the negative terminal P− of the battery pack 10. Therefore, the positive terminal of the battery 11, the positive terminal P+ of the battery pack 10, the external device, the negative terminal P− of the battery pack 10, and the negative terminal of the battery 11 may be electrically connected.

For example, the external device may be a charger or a load such as a motor of an electric vehicle powered by the battery 11.

Figure 13:
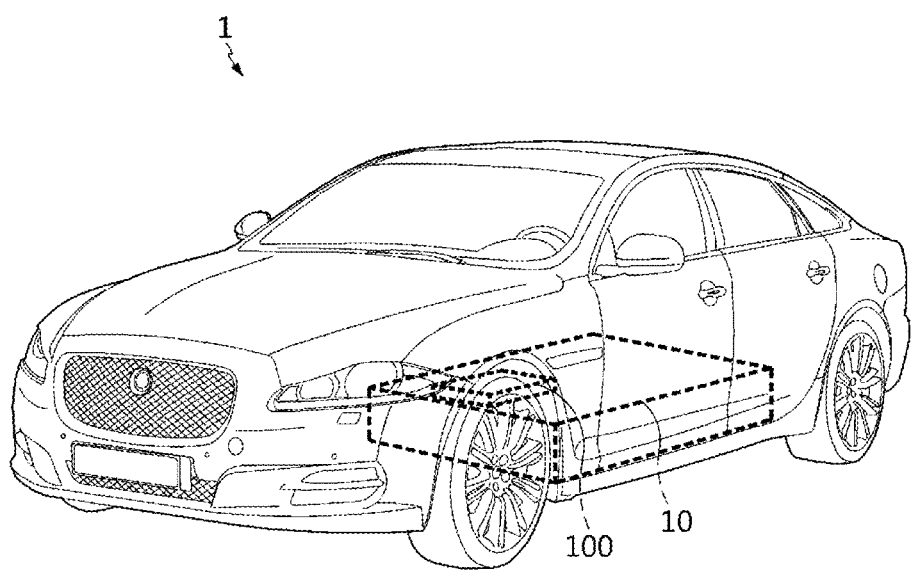
FIG. 13 is a view schematically illustrating a vehicle, according to another embodiment of the present disclosure.

FIG. 13 schematically illustrates a vehicle 1, according to another embodiment of the present disclosure.

Referring to FIG. 13, the battery pack 10, according to an embodiment of the present disclosure, may be included in a vehicle 1, such as an electric vehicle (EV) or a hybrid vehicle (HV). Here, the battery pack 10 may be the battery pack 10 described earlier. The battery pack 10 may supply power to the motor through an inverter provided in the vehicle 1, thereby driving the vehicle 1. Here, the battery pack 10 may include the battery managing apparatus 100 according to an embodiment of the present disclosure. That is, the vehicle 1 may include the battery managing apparatus 100.

Figure 14:
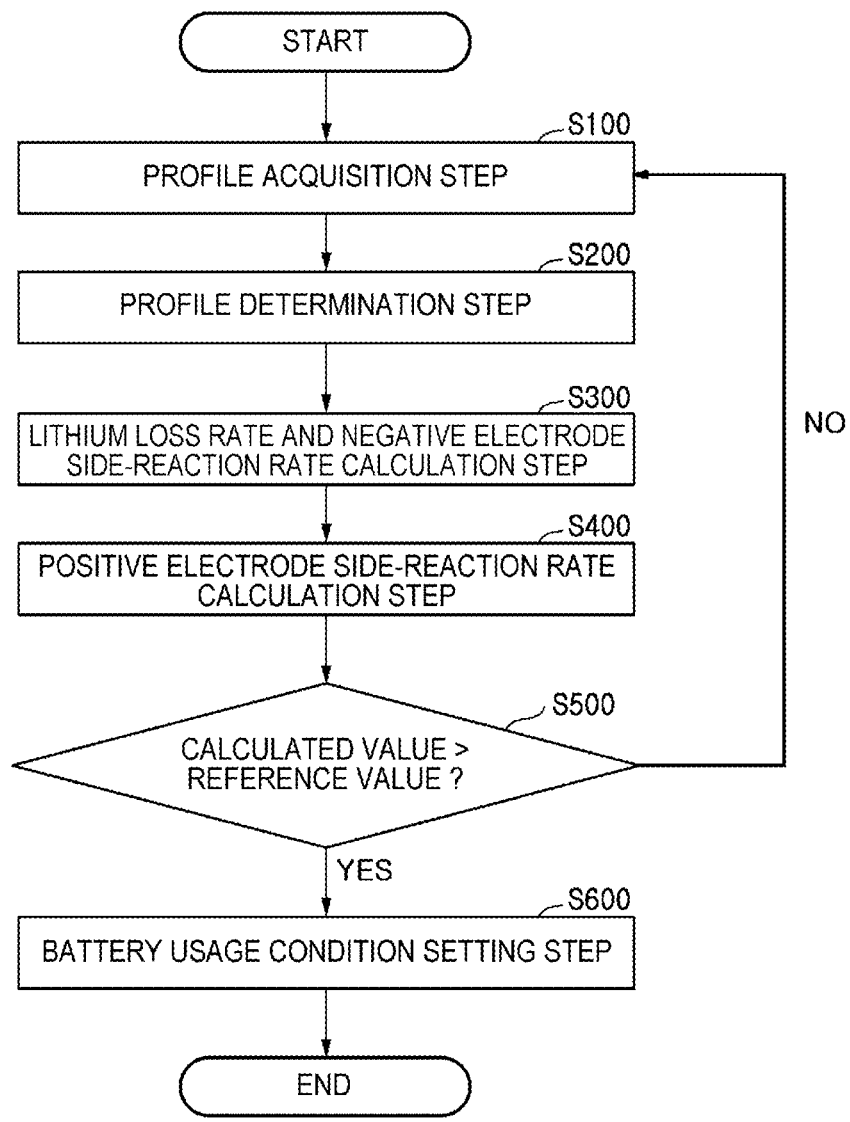
FIG. 14 is a view schematically illustrating a battery managing method, according to another embodiment of the present disclosure.

FIG. 14 is a view schematically illustrating a battery managing method according to another embodiment of the present disclosure.

Referring to FIG. 14, the battery managing method may include a profile acquisition step (S100), a profile determination step (S200), a lithium loss rate and negative electrode side-reaction rate calculation step (S300), a positive electrode side-reaction rate calculation step (S400), a calculated value comparison step (S500), and a battery usage condition setting step (S600).

Each step of the above-described battery managing method may be performed by the battery managing apparatus 100. Hereinafter, for convenience of explanation, descriptions that overlap those described above will be omitted or briefly explained.

The profile acquisition step (S100) is a step of obtaining a battery profile that represents the correlation between the voltage and the capacity of the battery, which may be performed by the profile acquisition unit 110.

The profile determination step (S200) is a step of determining the positive electrode profile and the negative electrode profile of the battery by adjusting a preset reference positive electrode profile and reference negative electrode profile to correspond to a battery profile. The profile determination step may be performed by the profile determination unit 120.

The lithium loss rate and negative electrode side-reaction rate calculation step (S300) is a step of calculating the lithium loss rate of a battery based on the positive electrode profile of the battery and calculating the negative electrode side-reaction rate of the battery based on the battery profile, which may be performed by the control unit 130.

According to an embodiment, the control unit 130 may be configured to extract the positive electrode activation onset point pi from the positive electrode profile PP of a battery as a diagnostic factor, and calculate the lithium loss rate of the battery based on the extracted diagnostic factor, a preset reference onset point, and a preset reference endpoint.

According to an embodiment, the control unit 130 may be configured to calculate the lithium loss rate based on the target value of the positive electrode activation onset point extracted as a diagnostic parameter, the positive electrode reference onset value of the positive electrode reference onset point, and the positive electrode reference endpoint value of the positive electrode reference endpoint.

For example, the control unit 130 may calculate the lithium loss rate using Equation 6 below. Equation 6 may be substantially the same as Equation 1 described above.

$$K_{Li} = \frac{pi_{MOL} - pi_{BOL}}{pf_{BOL} - pi_{BOL}} \qquad \text{[Equation 6]}$$

Here, $K_{Li}$ represents the lithium loss rate, $pi_{MOL}$ represents the target value of the positive electrode activation onset point, $pi_{BOL}$ represents the positive electrode reference onset value, and $pf_{BOL}$ represents the positive electrode reference endpoint value.

In another example, the control unit 130 may calculate the lithium loss rate using Equation 7 below. Equation 7 may be substantially the same as Equation 2 described above.

$$K_{Li} = \frac{pi_{MOL} - pi_{BOL}}{nf_{BOL} - ni_{BOL}} \qquad \text{[Equation 7]}$$

Here, $K_{Li}$ represents the lithium loss rate, $pi_{MOL}$ represents the target value of the positive electrode activation onset point, $pi_{BOL}$ represents the positive electrode reference onset value, $ni_{BOL}$ represents the negative electrode reference onset value, and $nf_{BOL}$ represents the negative electrode reference endpoint value.

According to an embodiment, the control unit 130 may calculate the capacity difference between the charging capacity and the discharging capacity. The control unit 130 may be configured to update the cumulative capacity difference by adding the calculated capacity difference to a preset cumulative capacity difference. The control unit 130 may preset the cumulative capacity difference by cumulatively summing the capacity differences respectively determined in the previous charge-discharge cycles of the battery.

The control unit 130 may calculate the negative electrode side-reaction rate by dividing the updated cumulative capacity difference by a preset reference capacity.

For example, the control unit 130 may calculate the negative electrode side-reaction rate using Equation 8 and Equation 9. Equations 8 and 9 may respectively be substantially the same as Equations 3 and 4 described above.

$$Q_{accum\_n} = \sum_{i=1}^{n}(Q_{ch\_i} - Q_{dch\_i}) \qquad \text{[Equation 8]}$$

Here, $Q_{accum\_n}$ represents the cumulative capacity difference. In addition, n represents the number of charge-discharge cycles at the current point in time (when the negative electrode side-reaction rate is being calculated), $Q_{ch}$ represents the charging capacity, $Q_{dch}$ represents the discharging capacity, and $(Q_{ch\_i} - Q_{dch\_i})$ represents the capacity difference in the $i_{th}$ charge-discharge cycle.

$$K_{ASR} = \frac{Q_{accum\_n}}{Q_1} \qquad \text{[Equation 9]}$$

Here, $K_{ASR}$ represents the negative electrode side-reaction rate, and $Q_1$ represents the reference capacity.

The positive electrode side-reaction rate calculation step (S400) is a step of calculating the positive electrode side-reaction rate of the battery based on the lithium loss rate and the negative electrode side-reaction rate. The positive electrode side-reaction rate calculation step may be performed by the control unit 130.

According to one embodiment, the control unit 130 may be configured to calculate the positive electrode side-reaction rate by calculating the difference between the negative electrode side-reaction rate and the lithium loss rate.

For example, the control unit 130 may calculate the positive electrode side-reaction rate using Equation 10. Equation 10 may be substantially the same as Equation 5 described above.

$$K_{CSR} = K_{ASR} - K_{Li} \qquad \text{Equation 10}$$

Here, $K_{CSR}$ represents the positive electrode side-reaction rate, $K_{ASR}$ represents the negative electrode side-reaction rate, and $K_{Li}$ represents the lithium loss rate. For example, $K_{ASR}$ is the negative electrode side-reaction rate according to Equation 9, and $K_{Li}$ is the lithium loss rate according to Equation 6 or Equation 7.

Subsequently, the control unit 130 compares the calculated positive electrode side-reaction rate, the negative electrode side-reaction rate, and the lithium loss rate with their respective preset reference values, and when the comparison result indicates that any of the reference values are exceeded (S500: YES), the control unit may set the battery usage conditions (S600). Through the appropriate setting of such battery usage conditions, it is possible to prevent or suppress battery degradation or the acceleration of degradation. In addition, by performing non-destructive diagnostics of the degree of degradation after using the battery for a certain period and making necessary adjustments based on the results, the safety of the battery may also be substantially improved. Meanwhile, when the calculated positive electrode side-reaction rate, the negative electrode side-reaction rate, and the lithium loss rate do not exceed their respective reference values (S500; NO), the process returns to a previous step (e.g., step S100) to obtain a new battery profile and repeat the above steps.

The above-described embodiments of the present disclosure are not limited to being implemented solely through apparatuses and methods, but may also be implemented through a program that realizes the functions corresponding to the configuration of the embodiments of the present disclosure or through a recording medium on which such a program is recorded. This may be readily implemented by a person ordinarily skilled in the technical field to which the present disclosure belongs based on the description of the embodiments described above.

While the present disclosure has been described above with reference to several embodiments and drawings, the present disclosure is not limited thereto, and various changes and modifications can be made by a person ordinarily skilled in the art to which the present disclosure pertains without departing from the technical spirit of the present disclosure and the equivalent scope of the claims to be described below.

In addition, since various substitutions, modifications, and changes can be made to the present disclosure as described above without departing from the technical spirit of the present disclosure by a person ordinarily skilled in the art to which the present disclosure pertains, the present disclosure is not limited to the above-described embodiments and the accompanying drawings, but all or some of the respective embodiments can be selectively combined so that various modifications can be made.

What is claimed is:

1. A battery managing apparatus comprising:
   a profile acquisition unit configured to obtain a battery profile representing the relationship between voltage and capacity of the battery;
   a profile determination unit configured to adjust a preset reference positive electrode profile and reference negative electrode profile to correspond to the battery profile and determine the positive electrode profile and negative electrode profile of the battery; and
   a control unit configured to calculate the lithium loss rate of the battery based on the positive electrode profile, calculate the negative electrode side-reaction rate of the battery based on the battery profile, and calculate the positive electrode side-reaction rate of the battery based on the lithium loss rate and the negative electrode side-reaction rate.

2. The battery managing apparatus according to claim 1, wherein the control unit is configured to calculate the positive electrode side-reaction rate by calculating the difference between the negative electrode side-reaction rate and the lithium loss rate.

3. The battery managing apparatus according to claim 1, wherein the battery profile is configured to include a charging profile representing the relationship between the voltage and the capacity of the battery during the charging process and a discharging profile representing the relationship between the voltage and the capacity of the battery during the discharging process.

4. The battery managing apparatus according to claim 3, wherein the control unit is configured to calculate the charging capacity of the battery from the charging profile, calculate the discharging capacity of the battery from the discharging profile, and calculate the negative electrode side-reaction rate based on the charging capacity and the discharging capacity.

5. The battery managing apparatus according to claim 4, wherein the control unit is configured to calculate the capacity difference between the charging capacity and the discharging capacity, add the calculated capacity difference to a preset cumulative capacity difference to update the cumulative capacity difference, and calculate the negative electrode side-reaction rate based on the updated cumulative capacity difference.

6. The battery managing apparatus according to claim 5, wherein the control unit is configured to calculate the negative electrode side-reaction rate by dividing the updated cumulative capacity difference by a preset reference capacity.

7. The battery managing apparatus according to claim 6, wherein the control unit is configured to preset the cumulative capacity difference by summing the capacity differences determined in each of the previous charge-discharge cycles of the battery.

8. The battery managing apparatus according to claim 3, wherein the profile determination unit is configured to adjust the reference positive electrode profile and the reference negative electrode profile to correspond to the discharging profile.

9. The battery managing apparatus according to claim 1, wherein the control unit is configured to extract a positive electrode activation onset point from the positive electrode profile of the battery as a diagnostic factor, and calculate the lithium loss rate of the battery based on the extracted diagnostic factor, a preset reference onset point, and a preset reference endpoint.

10. The battery managing apparatus according to claim 9, wherein the reference onset point includes a positive electrode reference onset point, and the reference endpoint may include a positive electrode reference endpoint, and
    the control unit is configured to calculate the lithium loss rate based on the target value of the extracted diagnostic factor, the positive electrode reference onset value of the positive electrode reference onset point, and the positive electrode reference endpoint value of the positive electrode reference endpoint.

11. The battery managing apparatus according to claim 9, wherein the reference onset point includes a positive electrode reference onset point and a negative electrode reference onset point, and the reference endpoint may include a negative electrode reference endpoint, and
    the control unit is configured to calculate the lithium loss rate based on the target value of the extracted diagnostic factor, the positive electrode reference onset value of the positive electrode reference onset point, the negative electrode reference onset value of the negative electrode reference onset point, and the negative electrode reference endpoint value of the negative electrode reference endpoint.

12. The battery managing apparatus according to claim 1, wherein the control unit is configured to set usage conditions for the battery based on at least one of the positive electrode side-reaction rate, the negative electrode side-reaction rate, and the lithium loss rate.

13. A battery pack comprising the battery managing apparatus according to claim 1.

14. A vehicle comprising the battery managing apparatus according to claim 1.

15. A battery managing method comprising:
    a profile acquisition step of obtaining a battery profile representing a relationship between the voltage and capacity of a battery;
    a profile determination step of adjusting a preset reference positive electrode profile and reference negative electrode profile to correspond to the battery profile and determining the positive electrode profile and negative electrode profile of the battery;

a lithium loss rate and negative electrode side-reaction rate calculation step of calculating a lithium loss rate of the battery based on the positive electrode profile of the battery and calculating a negative electrode side-reaction rate of the battery based on the battery profile; and a positive electrode side-reaction rate calculation step of calculating a positive electrode side-reaction rate of the battery based on the lithium loss rate and the negative electrode side-reaction rate.

16. The battery managing method according to claim 15, further comprising:

a step of comparing the lithium loss rate, the negative electrode side-reaction rate, and the positive electrode side-reaction rate with respective reference values.

17. The battery managing method according to claim 16, further comprising:

a step of setting usage conditions for the battery when, as a result of the comparison, any one of the lithium loss rate, the negative electrode side-reaction rate, and the positive electrode side-reaction rate exceeds the reference value.

* * * * *